US009767794B2

(12) United States Patent
Vibbert et al.

(10) Patent No.: US 9,767,794 B2
(45) Date of Patent: Sep. 19, 2017

(54) DIALOG FLOW MANAGEMENT IN HIERARCHICAL TASK DIALOGS

(71) Applicant: Nuance Communications, Inc., Burlington, MA (US)

(72) Inventors: Mitchell Vibbert, Everett, WA (US); Jacques-Olivier Goussard, Greenfield Park (CA); Richard J. Beaufort, Corbals (BE); Benjamin P. Monnahan, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/456,652

(22) Filed: Aug. 11, 2014

(65) Prior Publication Data
US 2016/0042735 A1 Feb. 11, 2016

(51) Int. Cl.
*G10L 15/18* (2013.01)
*G10L 15/22* (2006.01)
*G06F 9/48* (2006.01)

(52) U.S. Cl.
CPC ........ *G10L 15/1822* (2013.01); *G06F 9/4843* (2013.01); *G10L 15/22* (2013.01); *G10L 15/222* (2013.01); *G10L 2015/223* (2013.01)

(58) Field of Classification Search
None
See application file for complete search history.

(56) References Cited

U.S. PATENT DOCUMENTS

| 6,163,794 A * | 12/2000 | Lange ............... H04L 63/10 709/202 |
| 2003/0137537 A1 | 7/2003 | Guo et al. |
| 2003/0177240 A1* | 9/2003 | Gulko ............... G06F 8/451 709/226 |
| 2007/0088630 A1* | 4/2007 | MacLeod ........... G06Q 10/087 705/28 |
| 2007/0150289 A1* | 6/2007 | Sakuramoto ......... G10L 15/22 704/275 |
| 2009/0018829 A1 | 1/2009 | Kuperstein |
| 2009/0119104 A1 | 5/2009 | Weng et al. |

(Continued)

OTHER PUBLICATIONS

Peter Marwedel; "Mapping of Applications to Platforms"; Design book by Marwedel; https://1s12-www.cs.tu-dortmund.de/daes/media/documents/teaching/courses/ws1213/es/lecture/es-marw-6.1-aperiodic.pdf; Jan. 1, 2012.

(Continued)

*Primary Examiner* — Qian Yang
(74) *Attorney, Agent, or Firm* — Banner & Witcoff, Ltd.

(57) ABSTRACT

Methods and systems for managing multiple tasks using a dialog are presented. In some embodiments, a processor may parse a first natural language user input received at a user device to extract task related information from the first natural language user input. In response to identifying that the first natural language user input comprises a request to perform a first task, the processor may initiate execution of the first task. The user device may receive a second natural language user input after execution of the first task has been initiated which requests execution of a second task. The processor may initiate execution of the second task before execution of the first task is complete.

20 Claims, 10 Drawing Sheets

(56) References Cited

U.S. PATENT DOCUMENTS

2011/0289503 A1\* 11/2011 Toub ..................... G06F 9/4843
 718/102
2014/0200891 A1 7/2014 Larcheveque et al.
2015/0213260 A1\* 7/2015 Park ........................ G06F 21/54
 726/23

OTHER PUBLICATIONS

International Search Report and Written Opinion for PCT/US2015/043909; Nov. 25, 2015 (mail date).
Peter Marwedel; "Mapping of Applications to Platforms"; Lecture Notes based on Embedded System Design book by Marwedel, Jan. 1, 2012; XP055225395, Retrieved from the Internet: URL:https://ls12-www.cs.tu-dortmund.de/daes/media/documents/teaching/courses/ws1213/es/lecture/es-marw-6.1-aperiodic.pdf.
RavenClaw—Olympus, http://wiki.speech.cs.cmu.edu/olympus/index.php/RavenClaw, date Nov. 9, 2011, pp. 1-2.
Ravenclaw/olympus, The RavenClaw Dialog Management Architecture, http://www.cs.cmu.edu/~dbohus/ravenclaw-olympus/research.html, pp. 1.
Dan Bohus et al. "The RavenClaw dialog management framework: Architecture and systems," Computer Speech & Language, vol. 23, Issue 3, Jul. 2009, pp. 332-361, http://www.sciencedirect.com/science/article/pii/S0885230808000545.

\* cited by examiner

DIALOG FLOW MANAGEMENT IN HIERARCHICAL TASK DIALOGS

FIELD

The present disclosure relates to computerized natural language processing applications, and more specifically, to coordinating execution of multiple dialog-based tasks in conversational dialog applications.

BACKGROUND

With advances in natural language processing (NLP), there is an increasing demand to integrate speech recognition capabilities with interactive software applications such that the user can perform simple tasks using voice commands that were previously performed by customer service representatives or by the user interacting with an interactive graphical user interface of a computerized system. Automating some of these customer representative tasks can reduce customer representative hours and operating expenses. This automation is only effective if the users find a friendly and easy to use environment.

As an example, software agents in the form of intelligent personal assistants are being integrated into the operating systems of mobile devices and automobile dashboards. However, such speech recognition software is able to parse a very limited number of voice commands. Although the user can input voice commands for a handful of commands such as searching the worldwide web, taking a photograph, or composing a message, such intelligent personal assistants do not offer a mechanism for managing an entire set of tasks implemented by a more complex application.

Several mobile and web applications are task oriented. Certain dialog systems employing NLP and natural language understanding (NLU) support executing of discrete tasks such as filling forms, completing an online purchase, checking a user's bank balance information, etc. However, these systems cannot engage in dialog with the user and simultaneously perform a series of unrelated and related tasks that the user instructs while conversing with the dialog system.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Various aspects of the disclosure provide efficient, effective, functional, and convenient ways of executing dialog based tasks. In particular, in one or more embodiments discussed in greater detail below, dialog based task functionalities are implemented, and/or used in a number of different ways to provide one or more of these and/or other advantages.

In some embodiments, a computing device may identify that a first natural language user input comprises a request to perform a first dialog task. In response identifying a request to perform a first dialog task, the computing device may initiate execution of a first plurality of task agents comprised by the first dialog task according to a first hierarchical order by which task agents in the first plurality of subtasks are arranged for execution. In response to determining that a second natural language user input, received at the computing device during execution of the first dialog task, comprises a request to perform a second dialog task, the computing device may determine that the second dialog task is to be executed before execution of the first dialog task is completed. The computing device may initiate execution of a second plurality of task agents comprised by the second dialog task, prior to completion of the first dialog task, in an order based on a second hierarchical order by which task agents in the second plurality of task agents are scheduled for execution.

In some embodiments, in response to the second natural language user input requesting execution of a second dialog task, the computing device may suspend execution the first dialog task. The computing device may preserve a state of a natural language dialog and user inputs received during execution of the first dialog task. In response to determining that execution of the second dialog task has completed, the computing device may retrieve the state of the natural language dialog and user inputs received during execution of the first dialog task. The computing device may resume execution of the first dialog task from a point at which the first dialog task was suspended.

In some embodiments, at least one task agent of the first plurality of task agents may engage a user in a natural language dialog to extract information, from the second natural language user input received during execution of the first dialog task, required for the execution of the first dialog task.

In some embodiments, execution of the first plurality of task agents may further comprise scheduling each task agent of the first plurality of task agents for execution in an order based on the first hierarchical order of arrangement of the first plurality of task agents. Execution of the second plurality of task agents may comprise scheduling each task agent of the second plurality of task agents for execution in an order based on the second hierarchical order of arrangement of the second plurality of task agents.

In some embodiments, the computing device may determine whether execution of the second dialog task should be prevented.

In some embodiments, the computing device may identify which dialog task is to be executed based on the second natural language user input and information in the first plurality of task agents.

In some embodiments, the first dialog task and the second dialog task are managed simultaneously. The computing device switch between different dialog tasks based on a natural language dialog between the user and the computing device.

In some embodiments, the computing device may generate a list of parameters that each of the first plurality of task agents expects to identify from the natural language dialog. In response to parsing the natural language dialog, the computing device may associate at least one user input value from the natural language dialog with each parameter in the list of parameters and may execute the first plurality of task agents using the user input value.

In some embodiments, the computing device may determine that the second natural language user input comprises instructions to modify the currently executing first dialog task by adding additional task agents to the first hierarchical order. The computing device may schedule execution of the additional task agents to the first dialog task currently being executed according to the first hierarchical order.

These and additional aspects will be appreciated with the benefit of the disclosures discussed in further detail below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

Figure 1:
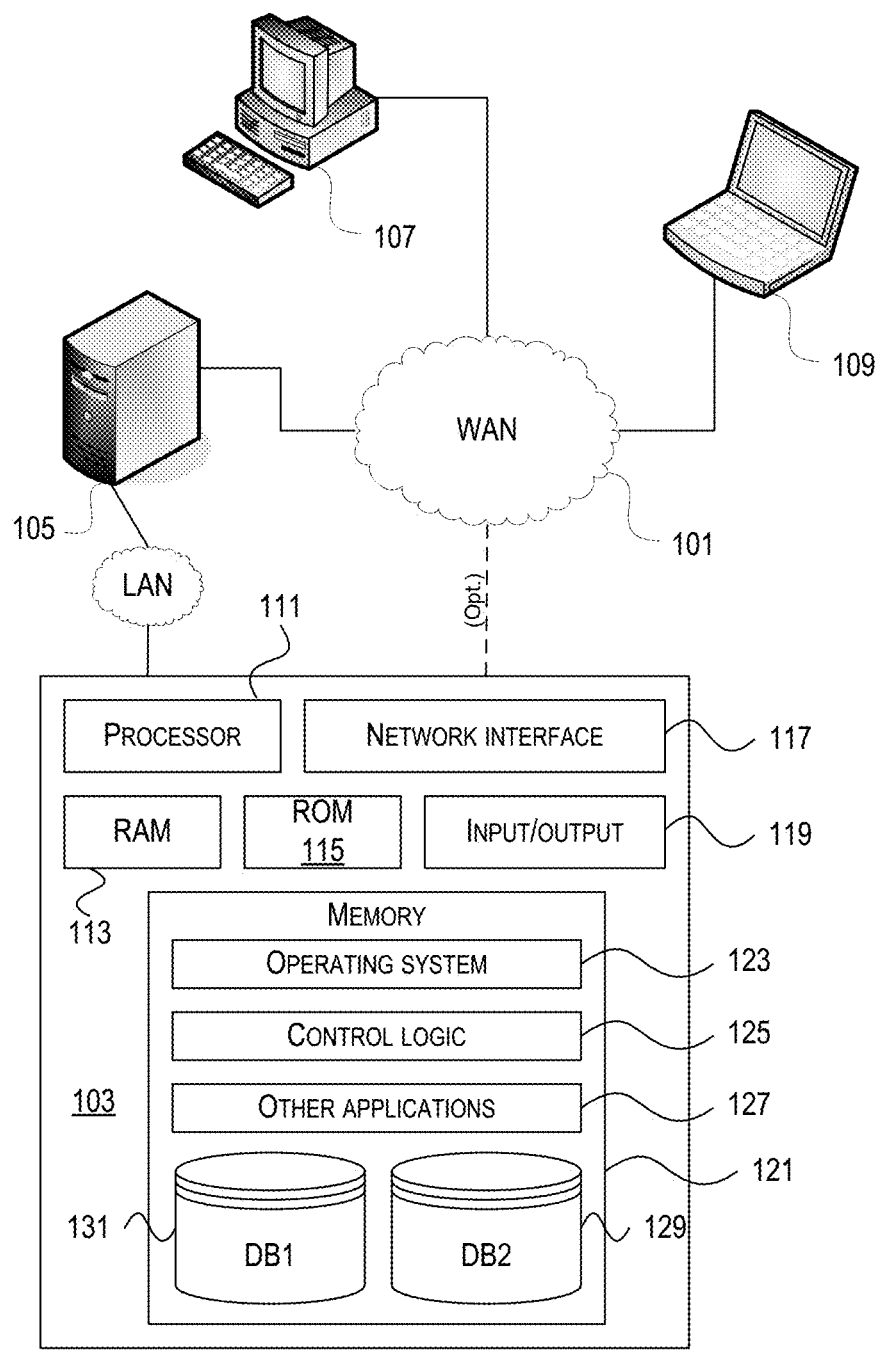
FIG. 1 depicts an illustrative computer system architecture that may be used in accordance with one or more illustrative aspects described herein.

In traditional conversational dialog applications, speech input is processed to facilitate execution of a task. Tasks such as ordering a pizza using an automated food ordering application or paying a bill through an online banking application may be performed in conjunction with dialog applications. The dialog application typically performs a task in isolation by gathering required information from a user through a series of preset prompts. The conversations initiated by such dialog applications are very rigid and perform only a single task in isolation. Dialog applications cannot handle user commands for multiple tasks simultaneously and cannot handle managing multiple tasks simultaneously. Conventional dialog applications limit the dialog for a particular task and do not allow invoking a separate task from the dialog of a currently executing task. In accordance with aspects of the disclosure, a conversational dialog arrangement is provided, which allows the various system components to manage an entire set of tasks associated with an application while processing speech input in a conversational dialog with the user to perform multiple tasks in parallel.

A task manager may be used to manage a variety of tasks that an application may implement. A task utilizing dialog management may be modeled as an ordered tree of dialog agents and agencies. Each dialog agent or dialog agency may be an independent subroutine which performs a specific function required by the task. By segmenting a task into hierarchically decomposed dialog agents and agencies and controlling the order in which each dialog agent and agency is invoked in performing a given task, a conversational dialog application may manage the execution of multiple different tasks. The conversational dialog application may create separate execution contexts for each task that it manages, allowing multiple tasks of the same or a different application to be run simultaneously in parallel.

In some embodiments, at runtime, the dialog application may choose to run a particular task based on user input (e.g., speech commands, user text commands, user manipulation of elements displayed in an interactive user interface, etc.) or the state of the application. Once launched, the task may consume dialog concurrently with other forms of user input. At any future time, the application may choose to invoke a second task regardless of whether the current task being performed has completed. When the task is switched in such a manner, the application may suspend the current task being performed and may preserve any input collected for the current task and activate the second task. The previous task that was suspended may be automatically resumed when the active second task terminates or when the application resumes the previous task as a result of user input or application logic. In some embodiments, an application may launch and manage multiple instances of the same task.

As an example embodiment, a task manager may implement a mobile banking application. Once the application launches, the user may instruct the application to "pay his bill." Accordingly, the task manager may capture this speech command and as a result, launch a new bill paying task in the mobile banking application and may display a pay bill screen on the user interface with which a user can interact. The user may answer prompts such as specifying his account information but in the middle of the bill paying task, the user may realize that he needs to transfer money into his bank's checking account in order to pay the bill and say "transfer money" or another similar phrase. The task manager may then suspend the bill paying task while preserving the user responses offered in the bill paying task and the current state of the bill paying task and may launch a new money transfer task using the mobile banking application. After completion of the voice enabled transfer of funds into the checking account with the money transfer task, the task manager may revert to the suspended state of the bill paying task and resume the bill paying task without having to prompt the user for information for the bill paying task that the user has previously inputted.

The task manager may enable such seamless switching of tasks by managing each task's subroutines and function calls. The task manager may manage all tasks supported by a particular application within a single dialog by reducing programming complexity, computing operations, and additional communications between an application and a remote server that result from multiple tasks being implemented without a task manager coordinating each task's subroutines.

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the present disclosure. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
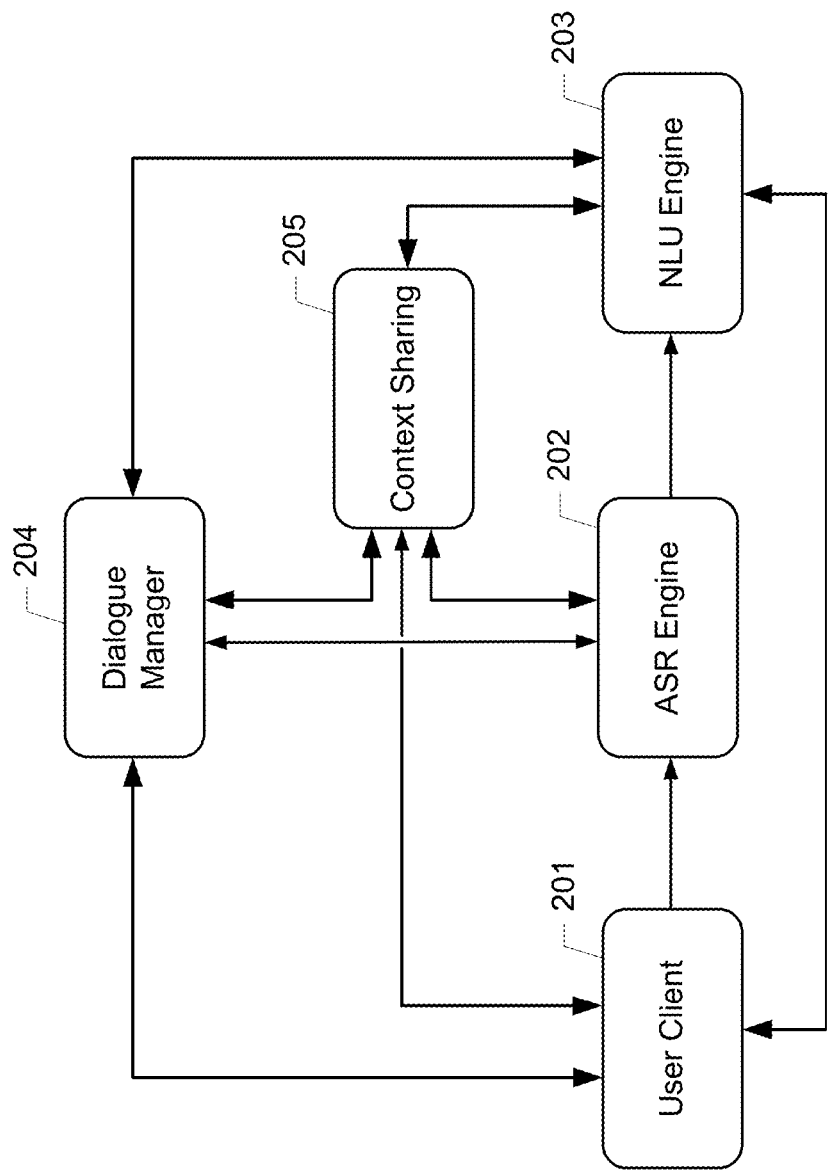
FIG. 2 depicts an illustrative multi-modal conversational dialog application arrangement that shares context information between components in accordance with one or more illustrative aspects described herein.

FIG. 2 depicts an example multi-modal conversational dialog application arrangement that shares context information between components in accordance with one or more example embodiments. A user client 201 may deliver output prompts to a human user and may receive natural language dialog inputs, including speech inputs, from the human user. An automatic speech recognition (ASR) engine 202 may process the speech inputs to determine corresponding sequences of representative text words. A natural language understanding (NLU) engine 203 may process the text words to determine corresponding semantic interpretations. A dialog manager (DM) 204 may generate the output prompts and respond to the semantic interpretations so as to manage a dialog process with the human user. Context sharing module 205 may provide a common context sharing mechanism so that each of the dialog components—user client 201, ASR engine 202, NLU engine 203, and dialog manager 204—may share context information with each other so that the operation of each dialog component reflects available context information.

The context sharing module 205 may manage dialog context information of the dialog manager 204 based on maintaining a dialog belief state that represents the collective knowledge accumulated from the user input throughout the dialog. An expectation agenda may represent what new pieces of information the dialog manager 204 still expects to collect at any given point in the dialog process. The dialog focus may represent what specific information the dialog manager 204 just explicitly requested from the user, and similarly the dialog manager 204 may also track the currently selected items, which typically may be candidate values among which the user needs to choose for disambiguation, for selecting a given specific option (one itinerary, one reservation hour, etc.), and for choosing one of multiple possible next actions ("book now", "modify reservation", "cancel", etc.).

Based on such an approach, a dialog context protocol may be defined, for example, as:

BELIEF=list of pairs of concepts (key, values) collected throughout the dialog where the key is a name that identifies a specific kind of concept and the values are the corresponding concept values. For example "I want to book a meeting on May first" would yield a BELIEF={(DATE, "2012/05/01"), (INTENTION="new_meeting")}.

FOCUS=the concept key. For example, following a question of the system "What time would you like the meeting at?", the focus may be START_TIME.

EXPECTATION=list of concept keys the system may expect to receive. For instance, in the example above, while FOCUS is START_TIME, EXPECTATION may contain DURATION, END_TIME, PARTICIPANTS, LOCATION, . . . .

SELECTED_ITEMS: a list of key-value pairs of currently selected concept candidates among which the user needs to pick. Thus a dialog prompt: "do you mean Debbie Sanders or Debbie Xanders?" would yield to SELECTED_ITEMS {(CONTACT, Debbie Sanders), (CONTACT, Debbie Xanders)}.

Communicating this dialog context information back to the NLU engine 203 may enable the NLU engine 203 to weight focus and expectation concepts more heavily. And communicating such dialog context information back to the ASR engine 202 may allow for smart dynamic optimization of the recognition vocabulary, and communicating the dialog context information back to the user client 201 may help determine part of the current visual display on that device.

Similarly, the context sharing module 205 may also manage visual/client context information of the user client 201. One specific example of visual context would be when the user looks at a specific day of her calendar application on the visual display of the user client 201 and says: "Book a meeting at 1 pm," she probably means to book it for the date currently in view in the calendar application.

The user client 201 may also communicate touch input information via the context sharing module 205 to the dialog manager 204 by sending the semantic interpretations corresponding to the equivalent natural language command. For instance, clicking on a link to "Book now" may translate into INTENTION:confirmBooking. In addition, the user client 201 may send contextual information by prefixing each such semantic key-value input pairs by the keyword CONTEXT. In that case, the dialog manager 204 may treat this information as "contextual" and may consider it for default values, but not as explicit user input.

In some embodiments, ASR engine 202 may process the speech inputs of users to text strings using speech to text conversion algorithms. ASR engine 202 may constantly pay attention to user feedback to better understand the user's accent, speech patterns, and pronunciation patterns to convert the user speech input into text with a high degree of accuracy. For example, ASR engine 202 may monitor any user correction of specific converted words and input the user correction as feedback to adjust the speech to text conversion algorithm to better learn the user's particular pronunciation of certain words.

In some embodiments, user client 201 may also be configured to receive non-speech inputs from the user such as text strings inputted by a user using a keyboard, touchscreen, joystick, or another form of user input device at user client 201. The user may also respond to output prompts presented by selecting from touchscreen options presented by user client 201. The user input to such prompts may be processed by dialog manager 204, context sharing module 205, and NLU engine 203 in a similar manner as speech inputs received at user client 201.

Dialog manager 204 may continuously be monitoring for any speech input from a user client, independent of tasks implemented at the dialog manager. For example, dialog manager 204 accepts voice commands from a user even when any tasks currently being implemented do not require a user input. A task manager, implemented by the dialog manager 204, may process the voice command and in response to the voice command, launch a new task or modify the execution of one or more tasks currently being implemented.

Figure 3:
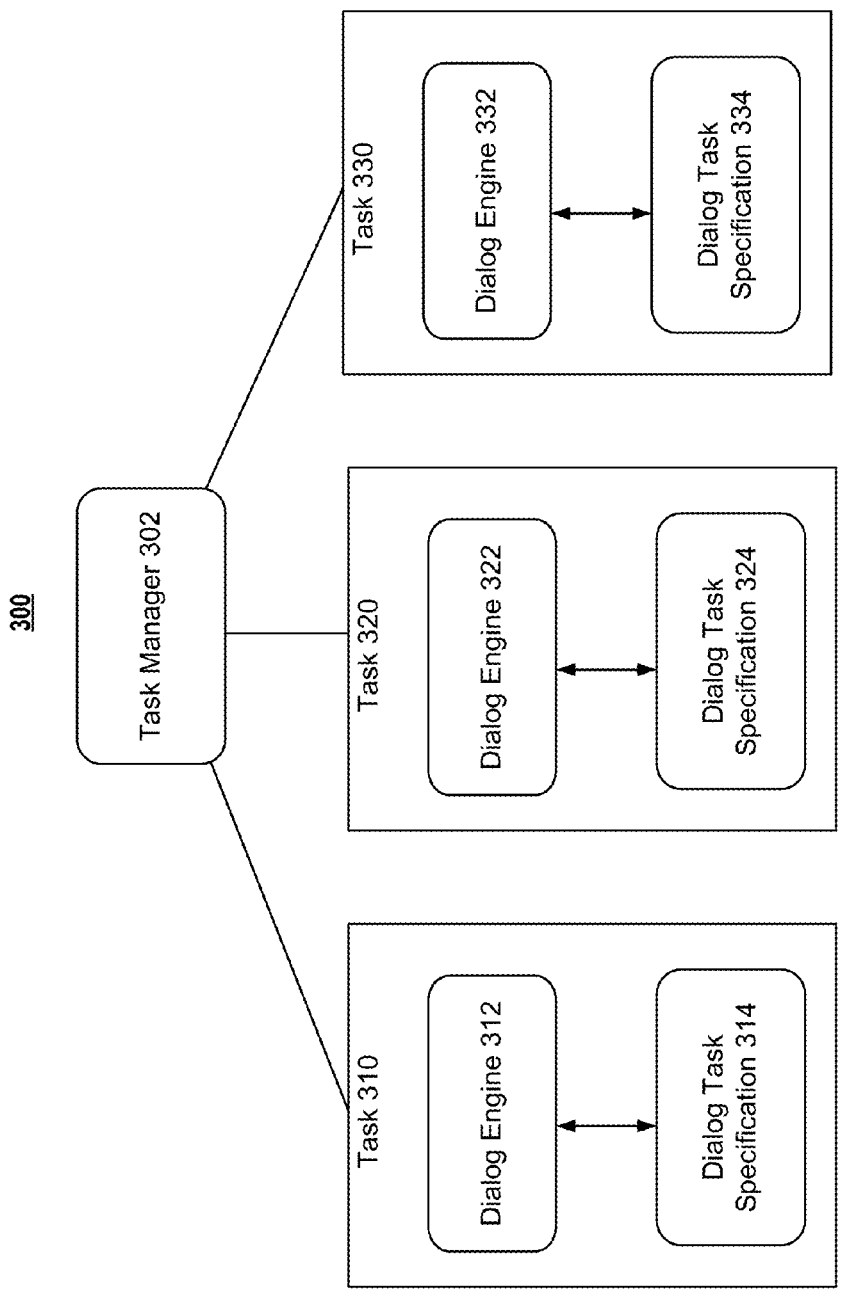
FIG. 3 depicts an illustrative conversational dialog application arrangement in which a task manager communicates with the tasks of the dialog application in accordance with one or more illustrative aspects described herein.

Task manager 302 may be in communication with tasks 310, 320, and 330 of a dialog application 300, as shown in FIG. 3. Each task may be represented by a two tier architecture comprising a dialog task specification and a dialog engine. A human's task may be modeled by separating task specific behavior and more general dialog behavior (i.e., conversational strategies). A description of the task to be performed may be provided by segmenting the task into a hierarchically decomposed set of subroutines in the task specification. The mechanisms for maintaining coherence and continuity of a conversation are generated by a dialog engine.

In the embodiment shown in FIG. 3, dialog task specification layers 314, 324, and 334 may comprise all of the dialog logic that tasks 310, 320, and 330 are governed by, respectively. Dialog engines 312, 322, and 322 may control the dialog implemented by tasks 310, 320, and 330, respectively, in an application 300 by executing tasks according to the logic instructed in their corresponding dialog task specification layers 314, 324, and 334, respectively. Task manager 302 may control the execution of each task in application 300 by passing instructions to the dialog engines of such tasks. In response to voice commands, task manager 302 may instruct different task dialog engines to either start, pause or abort operation. Task manager 302 may also coordinate the execution of tasks 310, 320, and 330 by pausing execution of one task in favor of another task or by facilitating inter-process communication (IPC) between different tasks implemented by the dialog application or even across multiple different dialog applications.

Task manager 302 may also control specific instances of a task by passing values to a task dialog engine that it is in communication with and retrieving specific values and parameters set during the execution of a particular task. Task manager 302 may be configured to execute function calls to initiate particular dialog agents and agencies out of the order specified in the task specification of a particular task. Task manager 302 may be configured to retrieve user supplied information from dialog agents and agencies for use in a different task to minimize prompting the user for information that the user has previously entered with relation to a previously run task. Accordingly, task manager 302 may be configured to set values for different concepts managed by particular dialog agents or dialog agencies of any one of the tasks it manages. Task manager 302 may be able to monitor the state of each task and determine which tasks are currently active and how long ago certain tasks were last active. Task manager 302 may use such activity information to schedule execution of tasks. Task manager 302 may also process user commands and schedule an order of execution of tasks according to the dialog input. Task manager 302 may be configured to schedule an initial task by default upon start of the dialog application.

Dialog engines 312, 322, and 322 may contribute conversational strategies such as turn taking between the application 300 and the user by controlling the execution time of each task subroutine found in the corresponding task specification layer. Dialog engines may also have the ability to suspend and resume each task. Dialog engines may be able to repeat a particular task subroutine, perform subroutines out of order, execute loops, and manipulate subroutines as desired to perform the task. Dialog engines may be controlled by task manager 302 to control execution of a task in a customized manner. Dialog engines may be able to respond to a user call for help and provide assistance. For example, in response to a task manager command to provide help to the user, a dialog engine may initiate a subroutine that provides helpful information or assistance to the user responsive to a help request.

In some embodiments, dialog engines may be responsible for maintaining the sophistication of a conversation dialog by implementing conversational strategies to the dialog between the application and the user according to human conversational techniques. For example, humans collaborate to establish a common ground in conversations. The dialog engine, while implementing the subroutines for a task specified in the task specification, may use probabilistic modeling and decision theory to make grounding decisions. By monitoring the amount of discrepancy there exists in the dialog between the user responses to the application prompts, the dialog engine may be able to determine whether the dialog needs to be adjusted to maintain the conversation. If such a determination is made, then the dialog engine may implement additional subroutines from the task specification to guide the conversation such that the system achieves a higher confidence level that the discrepancy between the application and the user in the subject matter of the conversation is minimized. Dialog engines for each task may monitor a grounding state (e.g., computed using Bayesian algorithms) of a conversation and adjust the conversation by adding or modifying application prompts to the user such that the necessary information required to complete the task is received from the user in an efficient manner.

Task specifications 312, 314, and 316 describing task specific behavior may be modeled with tree diagrams of task subcomponents. Most goal oriented dialog tasks have an identifiable structure which lends itself to a hierarchical description. The subcomponents may be typically independent, leading to ease in design and maintenance and provide scalability to each task for insertion of additional steps and repetition of steps at run time, allowing for dynamic construction of dialog structure. Dialog task specifications 314, 324, and 334 may comprise dialog agents and dialog agencies, which may each be independent program subroutines and are described in greater detail below with relation to FIGS. 4 and 5. Dialog agents may also be referred to herein as task agents or task dialog agents. Dialog agencies may also be referred to herein as task agencies or task dialog agencies. The structures of task specifications are described in greater detail below with connection to FIGS. 4 and 5A.

Dialog engines 312, 322, and 332 may control the dialog between the user and the application during implementation of their respective tasks. Dialog engines 312, 322, and 332 may execute the dialog task specifications for their corresponding tasks in two phases: an execution phase and an input phase. During the execution phase, various dialog agents (i.e., task subroutines) may be executed to produce the dialog application's behavior. During the input phase, the dialog application may collect and incorporate information from the user's input. The execution and input phases are described in greater detail below with connection to FIG. 5B.

In some embodiments, the task manager 302 may invoke different tasks that it manages based on the user dialog. For example, the task manager 302 may manage multiple tasks 3110, 320, and 330 by communicating with their respective dialog engines 312, 322, and 332. In one implementation, a single task may be executed at a given time but the task manager 302 may manage multiple tasks simultaneously even though only one of the tasks is actively executing at any given time. For example, the task manager 302 may manage each of the different tasks that it manages in different execution spaces (e.g., different memory areas of a device's memory such as memory 121). Dialog engines 312, 322, and 332 may identify when a user desires, from received dialog input, to switch to a second task while a first task is in progress. Dialog engines 312, 322, and 332 may communicate with task manager 302 that the dialog is requesting a task different from their own. Accordingly, the task manager 302 may suspend the first task and activate a second task. For example, the task manager 302 may instruct dialog engine 312 to suspend task 310 in favor task 320. Task manager 302 may then instruct dialog engine 322 to execute task 320. The task manager 302 may switch between multiple tasks that they manage based on the nature of the dialog. The task manager 302 may also queue a plurality of tasks in a given order and execute a second task once the task preceding it in the queue is completed.

In some embodiments, the application 300 may be able to override any tasks that have been invoked by the task manager 302 or dialog engines 312, 322, and 332. The application 300 may have control over any tasks, or any tasks' dialog agents and dialog agencies. For example, once task manager 302 has instructed dialog engine 312 to activate task 310 at a given time, application 300 may determine that task 310 should not be activated at the given time. Accordingly, application 300 may suspend execution task 310. Application 300 may override task requests passed from task manager 302 to dialog engines 312, 322, and 332 in order to prevent the execution of tasks which, if run at a given time, may cause instability in certain application processes, cause application 300 to fault or crash, or cause any runtime errors.

Figure 4:
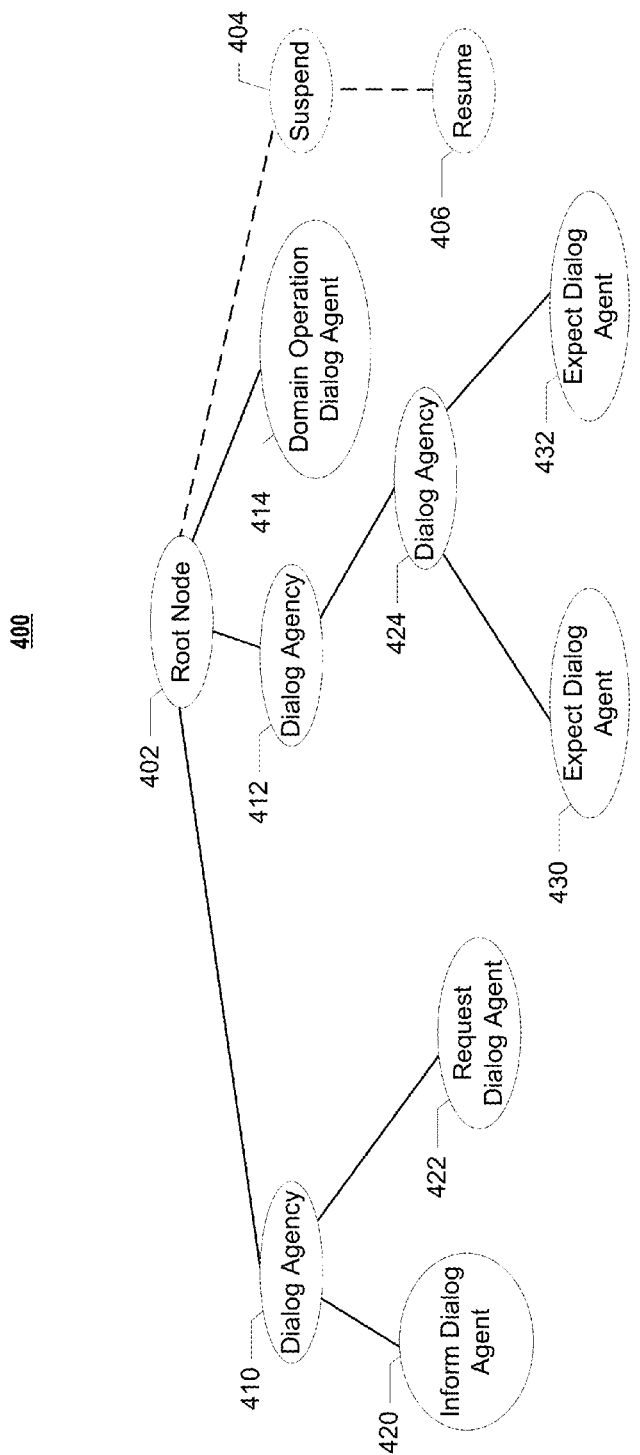
FIG. 4 depicts an illustrative tree diagram architecture of a task implemented by the dialog application in accordance with one or more illustrative aspects described herein.

FIG. 4 depicts a tree diagram 400 of a task implemented by the dialog application. In particular, tree diagram 400 illustrates an illustrative organizational structure for the task specification of a dialog application task. Root node 402 may be the topmost node in the task specification layer. The root node may control the execution of children nodes 410, 412, and 414 that are both connected to the root node in the task tree diagram 400 of the application. Each node of the task tree 400 may be a dialog agency or a dialog agent. Terminating nodes 414, 420, 422, 430, and 432 of task tree 400 may be dialog agents and non-terminating nodes 410, 412, and 424 may be dialog agencies.

In some embodiments, each dialog agent in a task tree handles a portion of the dialog task. A dialog agent may comprise an independent subroutine, software module, or function call that includes instructions to perform a specific task function. There may be four fundamental types of dialog agents: 1) an inform dialog agent such as inform dialog agent 420; 2) a request dialog agent such request dialog agent 422; 3) an expect dialog agent such as expect dialog agents 430 and 432; and 4) a domain operation dialog agent such domain operation dialog agent 414. Inform dialog agents may transmit an output to the user, either in the form of synthesized speech output or a visual output on a display device of a client device. Inform dialog agents may present the user with information or acknowledge a user's input according to conversational strategies to maintain a continuous dialog between the application and the user. A request dialog agent may request information from the user. For example, a request dialog agent may prompt the user for information and listen for user speech input in response to the prompt. Alternatively, the request dialog agent may also allow the user to answer a prompt by typing an answer or by selecting from one of several options displayed on a user interface display. An expect dialog agent may include instructions that allow the application task to expect information to be inputted from the user without prompting the user for any information. Domain operation dialog agents may include instructions to perform a function that processes information received by the user but does not involve user input or output.

Dialog agencies such as dialog agencies 410, 412, and 424 may control execution of their subsumed dialog agents. Dialog agencies may capture high level temporal and logical structure of a particular task and control when and how the dialog agents which they control should be executed. Each dialog agent may subsume multiple different dialog agents. Dialog agents may be controlled by dialog agencies, root node 402 or even by a task manager.

Each dialog agent and dialog agency may include instructions to implement an execution routine in which the function that they encode is performed. The execute routine for a dialog agent may be specific to the fundamental type of the dialog agent (i.e., inform, request, expect, or domain operation). For example, inform type dialog agents may generate an output when their execution routine is implemented while request type dialog agents may initiate an input phase to collect a user's input to a prompt. Each dialog agent may also comprise a set of preconditions and triggers that must be met before their respective execution routines may be implemented. For example, a request dialog agent 422 that requests the user to specify which bill to pay will initiate its execution routine after the request dialog agent is specified with precondition information encoded in the request dialog agent. For example, once information that identifies the user and a request to pay a bill have been received, the request dialog agent may be executed.

Execution routines of dialog agencies may specify the order in which each dialog agency's subsumed dialog agents may be executed. Dialog agencies may select from a set of different execution policies for their subsumed agents and agencies (hereinafter referred to as subsumed dialog agents or subsumed dialog agencies). As an example, a dialog agency with multiple subsumed dialog agents may execute the dialog agents in a left to right order of arrangement on task tree 400 of the dialog agents' placement. A dialog agency may also plan execution of its subsumed dialog agents in a sophisticated manner by determining if a particular dialog agent's execution provides much needed system resources and scheduling execution of such identified dialog agents. A task manager may also control the order of execution of a particular dialog agency's subsumed dialog agents. For example, a task manger may determine that a certain dialog agent yields necessary information that can be passed to a different dialog application task that the task manager is also managing. Accordingly, the task manager may instruct a dialog agency to reorder the order in which the identified dialog agent is executed with respect to other subsumed dialog agents if such a reordering of the order of execution of subsumed dialog agents does not interfere with the efficient operation of the task. The task manager may reorder the order of execution of certain dialog agents with respect to the order specified in a task specification by suspending and resuming the dialog agents and agencies. For example, the task specification for a given task may specify, in task tree 400, that dialog agent 430 is to be executed before dialog agent 432. However, the task manager may choose to modify the order of execution such that dialog agent 432 is executed before dialog agent 430. Accordingly, after the dialog engine executes dialog agency 424 and initiates execution dialog agent 430 as specified by task tree 400, the task manager may instruct the dialog engine to suspend dialog agent 430 and initiate execution of dialog agent 432. Once dialog agent 432 has been executed, the task manager may instruct the dialog engine to resume execution of dialog agent 430. In this manner, by suspending and resuming certain dialog agents and agencies, the task manager may reorder the execution order of dialog agents and agencies in a manner that it best determines suits the needs of received dialog inputs.

In some embodiments, a dialog agency may also modify the order of execution of its subsumed dialog agents. The dialog agency may continuously modify the order of execution of its subsumed dialog agents as the dialog agency or task manger learns, through reinforcement learning methods and other Markov decision-making processes, how to better perform a dialog task. For example, the task manager, root node, or dialog agency may decide that in order to better perform a particular task, an additional function (i.e., dialog agent) may need to be added to a task. The exact position in which the new dialog agent may be inserted (i.e., under which dialog agency) in the task specification may be determined. The identified dialog agency under which the new dialog agent is to be added may reorder the order of execution of its subsumed dialog agents and/or agencies by evaluating the preconditions, triggers, and completion criteria of all of its previously subsumed dialog agents and/or agencies and newly added dialog agents and/or agencies.

Dialog agencies and dialog agents may also each comprise completion criteria that determine when each of their execution may be terminated. For example, a request dialog agent may terminate only when all the user responses specified in the request dialog agent's completion criteria are collected. Similarly, dialog agencies may also specify completion criteria that must be met as a result of execution of their subsumed dialog agents and agencies in order to terminate successfully. Once such completion criteria are met, the corresponding dialog agents or agencies may send a completion message to their parent node indicating completion of their assigned function such that the parent node may proceed to continue execution of another dialog agent or agency.

The dialog task specification may specify an overall hierarchical plan for the dialog task by associating preconditions, triggers, and completion criteria and may execute routines for each of the task 400's dialog agents and dialog agencies. A dialog engine responsible for traversing task tree 400 of a given task specification may specify the order in which the dialog agents and/or agencies of task tree 400 are to be executed with respect to each other by evaluating the policies (i.e., preconditions, triggers, completion criteria etc.) of the dialog agents and agencies of a task.

In some embodiments, dialog agents may store concepts and participate in the input phase of a dialog engine to incorporate the information collected from a user into the dialog application system. For example, a request dialog agent that prompts the user for identification information may store such user identification information in the dialog application system for use by dialog agents of that particular task or even a different task in the dialog application. Such concepts may also include task related information. Concepts stored by the dialog agent may be represented as probability distributions over a set of possible values that allow for decision making and updating the dialog application's belief system under uncertain circumstances. User input values received from a dialog may be bound to concepts by dialog engine 550 to satisfy the completion criteria of dialog agents and agencies.

In some embodiments, dialog agencies and a task manager may coordinate with each other to facilitate implementation of conversational strategy in the execution of the dialog application. Conversational strategies such as turn taking behaviors, managing timing and order in which information is presented and asked from the user, grounding behavior such as seeking confirmation or reducing ambiguity in the conversation, repeating the last uttered dialog, suspending and resuming the dialog, restarting the dialog, and re-establishing context of the conversation may be implemented by coordination of dialog agents and agencies with the root node and task manager.

Certain control dialog agencies such as dialog agencies 404 and 406 may be specified in the task specification to suspend and resume a conversation. In some embodiments, when a dialog engine receives a request to suspend or resume a dialog task, the dialog engine may instruct task manager or root node 402 to modify task tree 400 by changing placement of dialog agencies 404 and 406 such that they are connected to the dialog agent or dialog agency that is currently being executed. Suspend dialog agency 404 may include instructions for a dialog engine to preserve a global state of the dialog, belief states, any concepts and information received from the user, and initialized routines in a portion of the user device's memory until the task manager or root node instructs the application to resume the task. Accordingly, resume dialog agency 406 may include instructions to retrieve dialog global states, belief states, any concepts and information received from the user, and initialized routines stored by suspend dialog agency 404 and restore the suspended dialog agents and agencies to resume their operation in response to a resume dialog agency 406 being triggered by the root node 402 or a task manager.

In some embodiments, individual dialog agencies and dialog agents may control turn taking protocols. For example, each dialog agent may be configured to display or output information to the user one after the other when the user has finished entering user input and is awaiting for the dialog application to act. Similar, each dialog agency may control outputting information encoded in the dialog agency's subsumed dialog agents in an ordered fashion by specifying that information must be delivered to the user piecemeal to avoid overwhelming the user with information and in order to maintain good conversational strategy.

The dialog engine may be configured to control any dialog agents in task tree 402 to repeat the last action performed by that dialog agent. Each dialog agent may include the necessary structure to repeat portions of its subroutines to present the user with information or audio output if the user has requested to have the last uttered information by the application repeated or have the last performed application action repeated.

Figure 5A:
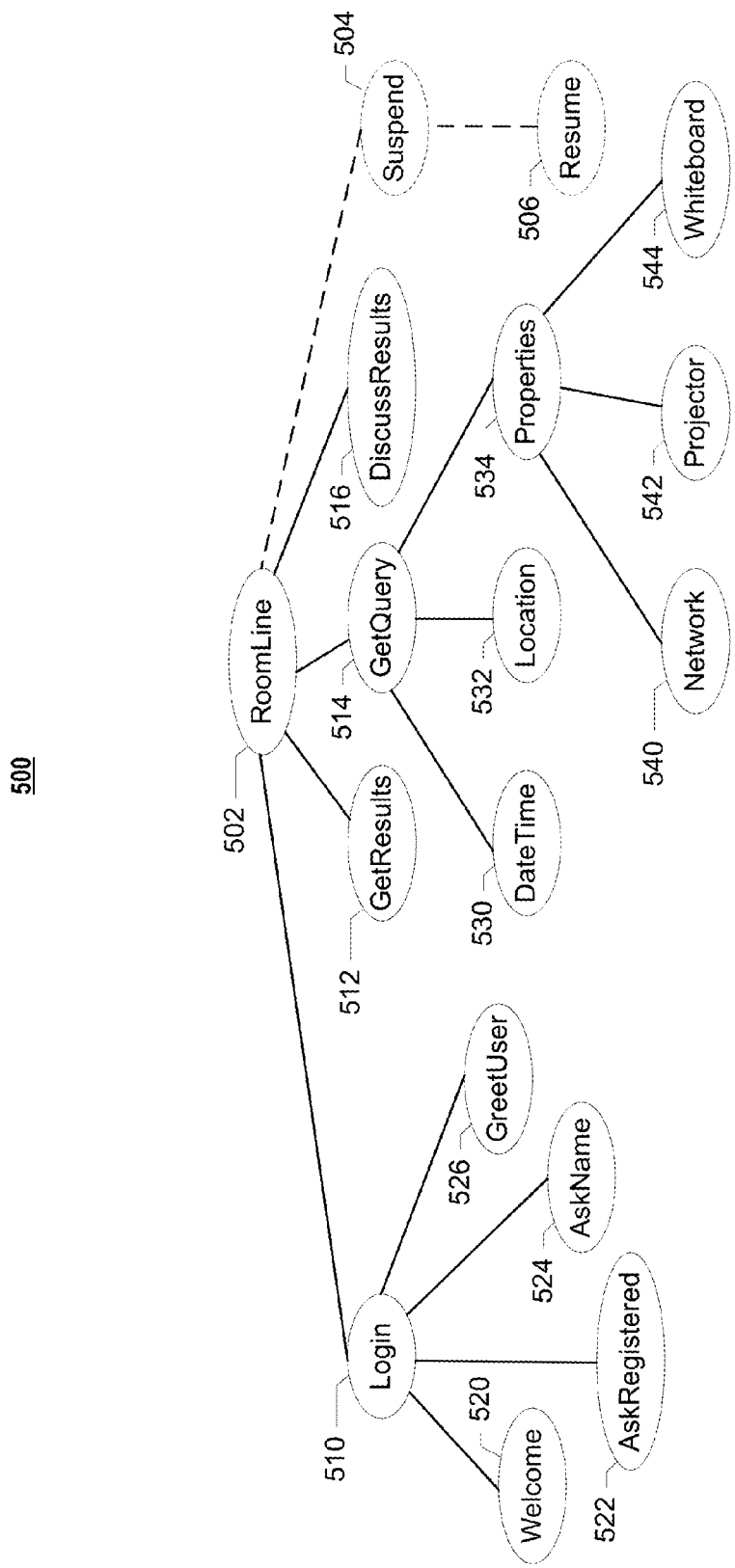
FIG. 5A depicts an illustrative diagram of the task tree of a conference room reservation task in accordance with one or more illustrative aspects described herein.

FIG. 5A illustrates an illustrative task tree 500 for a conference room reservation and scheduling task. Root node 502, labeled RoomLine, manages dialog agencies 510, 514, and 504 and dialog tasks 512 and 516.

Dialog agency 510 may correspond to a user login subroutine that involves identifying a user, user registration and logon, and introducing the user to the dialog application. Login dialog agency 510 may be further decomposed into Welcome dialog agent 520 responsible for welcoming and introducing the user to the dialog application and the system, dialog agents 522 and 524 that handle identifying the user and verifying his authentication credentials, and dialog agent 526 that presents the authenticated user with a greeting. Welcome dialog agent 520 and GreetUser dialog agent 526 may be inform type dialog agents that only output information to the user in the form of audio or visual displays on a user interface display device. Alternatively, GreetUser dialog agent 526 may be an expect type dialog agent that could both display information to the user and receive information from the user regarding what action the user would next like to perform once he is logged in without explicitly prompting the user. AskRegistered dialog agent 522 may be a requested type dialog agent that requests contains dialog information necessary to prompt the user to enter a yes or no response of whether he is a registered user. Dialog agent 524 may be a request type dialog agent that prompts the user to enter his username or nickname (i.e., Registered Name) to be used to address the user in conversations with the dialog application. Alternatively, dialog agent 524 may be an expect type dialog agent that identifies the user name information from the entered user information without having to explicitly prompt the user to enter his name. For example, dialog agent 524 may be able to identify the user's nickname by searching a local or remote database of user information by using the supplied authentication credentials.

In some embodiments, dialog agency 514 may correspond to a series of function calls to obtain user information from the user. For example, the GetQuery dialog agency 514 may comprise subsumed dialog agent 530 that obtains the date and time for which the user wishes to reserve a new conference, dialog agent 532 that obtains the location of the user desired conference room, and dialog agency 534 that obtains further properties and characteristics of the desired conference room. Dialog agency 534 may subsume dialog agents 540, 542, and 544 which may obtain information from the user whether the user a networked connection to the Internet, a projector, and a whiteboard are required in the desired conference room, respectively. While dialog agents 530 and 532 may be request type dialog agents which obtain the necessary criteria to implement a search for a conference room, dialog agents 540, 542, and 544 may be expect type dialog agents. By having expect type dialog agents 540, 542, and 544 be responsible for obtaining additional conference room characteristics from the user, the dialog application affords the user the flexibility to be able to specify additional search criteria if he so desires without burdening the user to be required to enter such optional search criteria.

Dialog agent GetResults 512, a child of the root RoomLine agency 502, may include functions to execute a search for the conference room at a remote backend server with the details of the user request obtained by dialog agency 514 and its subsumed dialog agents. Dialog agent 516 may present the results of the conference room search obtained by dialog agent 512 to the user. Dialog agent DiscussResults 516 may contain instructions for handling additional conversational dialog between the user and the dialog application for negotiating and selecting a conference room based on the results presented to the user to select the conference room best matching the user's specific needs. Dialog agent Get-Results 512 may be a domain operation type dialog agent that does not input or output information to or from a user. Accordingly, dialog agent 512 may not contain instructions to interact in dialog with a user. Instead, dialog agent 512 may comprise instructions, which when implemented, cause a search to be executed for a conference room that matches search parameters for the conference room obtained from the user from dialog agency 514 and its subsumed dialog agents 530, 532, 540, 542, and 544. Dialog agent 512 may include instructions to search a remote database of conference room information that associates conference room with searchable attributes to identify conference rooms that match the user specified parameters.

Dialog agencies 504 and 506 for suspending and resuming any subroutine of task tree 500 may correspond to dialog agencies 404 and 406 of FIG. 4. When a dialog engine receives a request to suspend or resume a dialog task from the task manager, the dialog engine may instruct task manager or root node 502 to modify task tree 500 by changing placement of dialog agencies 504 and 506 such that they are connected to the dialog agent or dialog agency that is currently being executed.

Figure 5B:
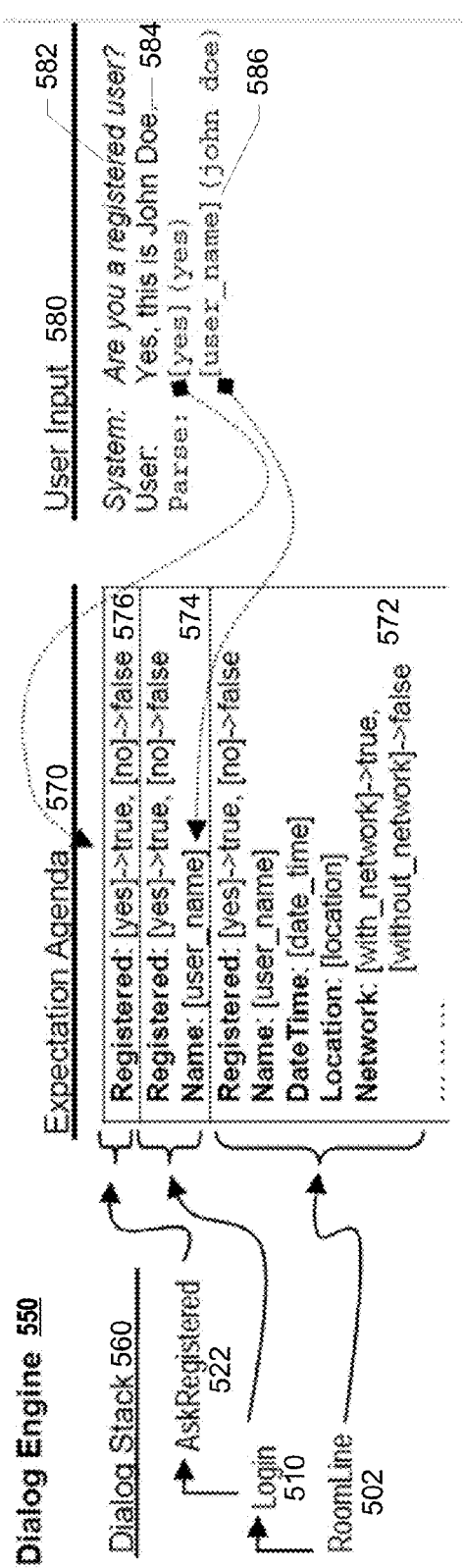
FIG. 5B depicts an illustrative diagram of a task dialog engine that executes a conversation dialog between a user to execute a conference room reservation task in accordance with one or more illustrative aspects described herein.

FIG. 5B depicts an illustrative diagram of a task dialog engine 550 that executes a conversation dialog between a user to execute a conference room reservation task in conjunction with task specification 500 of FIG. 5A. A dialog engine may step through the task tree of its corresponding task specification to execute the task according to instructions provided in each task subroutine, encoded by the dialog agents and dialog agencies of the task specification, during an execution phase. In the execution phase, dialog engine 550 may track the dialog structure and may schedule dialog agents and dialog agencies of task tree 500 in a dialog stack 560. During an input phase, dialog engine 550 may collect information from the user, by engaging the user in a dialog, to pass on to the subroutines being implemented in dialog stack 560.

During the execution phase, dialog engine 550 may traverse task tree 500 of a corresponding task specification and place dialog agencies and dialog agents for execution in dialog stack 560. Initially, the root dialog agent 502 may be placed on the dialog stack 560. Dialog stack 560 may capture the temporal and hierarchical structure of the current dialog, as determined by dialog engine 550. As dialog engine 550 progresses down the task tree 500, dialog engine 550 may place other dialog agencies and dialog agents subsumed by root dialog agent 502 on top of stack 560 for execution above dialog agent 502. Dialog engine 550 may schedule dialog agencies and dialog agents for execution in an ordered fashion on stack 560 and may execute the dialog agent or agency on top of stack 560. When a dialog agency is executed, dialog engine 550 may schedule a dialog agent subsumed by the dialog agency being executed on top of stack 560 for execution. Execution of dialog agents generates the responses and actions of a dialog application. Once a dialog agent or dialog agency has completed execution and met its completion criteria, dialog engine 550 may remove the completed dialog agent or agency from stack 560.

In some embodiments, the user can also take initiative and shift the focus of the conversation to another part of the dialog task tree 500. For example, the dialog engine 550 may allow for the order of execution of dialog agents and agencies to be controlled by user input as long as such user initiated execution does not violate any policies, preconditions, or task logic specified in any dialog agents, agencies, or the dialog engine 550. The task manager may monitor user input received at any time, even during the execution phase and control the task execution. The task manager may coordinate a user initiated modified execution of the task along with dialog engine 500. For example, the task manager may modify the order in which dialog agents and agencies are executing by suspending certain dialog agents and agencies in task tree 500 to reorder the order of execution of dialog agents and agencies. Additionally, the task manager may modify task tree 500 by adding new dialog agents onto preexisting nodes of task tree 500 and direct dialog engine 500 to execute the modified task tree by pushing the newly added dialog agents onto dialog stack 560 according to the new order specified in modified task tree 500.

The dialog engine 550 may also be configured to execute suspend and resume dialog agencies 504 and 506 at any time when directed by a user. For instance, dialog engine 550 may detect a user input to suspend a task or dialog agents and/or agencies at any point of time during the task's execution phase. In response to such detected user suspend command, dialog engine 550 may trigger dialog agency 504 and push dialog agency 504 on top of dialog stack 560, even on top of any currently executing dialog agents on top of dialog stack 560 and immediately execute agency 504 to suspend execution of the dialog agent immediately underneath suspend agency 504 on dialog stack 560.

In some embodiments, dialog engine 550 may modify the order in which dialog agents and/or agencies are executed and may choose a different order than the order specified in the task specification. For example, the task specification may specify that dialog agents listed in task tree 500 are to be executed in a left first top first manner. According to task tree 500, for example, dialog agent 530, that sets the date and time the conference room is to be reserved, is to be executed before dialog agent 532, responsible for setting the location of the requested conference room. However, if the dialog engine 550 receives dialog input from the user specifying the location of the requested conference room before the date and time for the conference room request, then dialog engine 550 may initiate execution of dialog agent 532 before dialog agent 530 by placing dialog agent 532 onto the dialog stack 560 at a higher position than dialog agent 530.

In some embodiments, dialog engine 550 may push new agencies modeling conversational strategies on dialog stack 560. For example, dialog engine 550 may push conversational strategy dialog agencies not associated with a particular agency or agent according to task tree 500 to implement improved conversational strategy. Dialog engine 550 may continuously adjust its conversational strategy by monitoring which conversational techniques achieve the highest grounding and minimize the degree of uncertainty in conversations. Once dialog engine 550 identifies a particular conversation technique that results in better conversational strategy than one implemented by other dialog agents, dialog engine 550 may push the dialog agency corresponding to the improved conversational technique onto the dialog stack 560 during execution of other dialog agents to further augment the conversation quality provided during their execution. In such a manner, dialog stack 560 may track the current structure of the dialog, and dialog engine 550 may provide support for focus shifts and handling sub-dialogs, during the execution phase.

Dialog engine 550 may process user input received during an input phase to direct execution of dialog agents and agencies intelligently on dialog stack 560. An input phase of dialog engine 550's operation may involve three stages: 1) construction of an expectation agenda 570, binding values received from user input to concepts and 3) analyzing needs for focus shift in the dialog. Dialog engine 550 may implement each of these three stages of the input phase sequentially or in parallel. In some implementations, dialog engine 550 may perform each of these three stages iteratively, using the output of any of the stages as feedback inputs for another stage. For instance, dialog engine 550 may continuously modify expectation agenda 570 having bound user input values to concepts or having analyzed needs for dialog focus shifts in order to continuously improve the expectations of any dialog agents or agencies using the bounded concepts or dialog focus shifts.

In some embodiments, dialog engine 550 may construct expectation agenda 570 for its corresponding task by collecting the expectations of each dialog agent listed in task tree 500. For example, dialog engine 550 may traverse task tree 570 in a top down manner starting with root node 502 and instruct each dialog agent and dialog agency to declare its expectations. A dialog agent's expectation comprised in expectation agenda 570 may describe the semantic grammar slots that each agent monitors, the concept that each dialog agent updates, and how such an update is performed. A dialog agency's expectations may comprise all of the expectations of its subsumed dialog agents. The example embodiment depicted in FIG. 5B shows that expectation agenda 570 includes expectations 572, 574, and 576 that correspond to the expectations of dialog agencies 502, 510, and dialog agent 522, respectively. Since dialog agency 502 subsumes dialog agency 510, which in turn subsumes dialog agent 522, expectation 572 of dialog agency 502, stored in expectation agenda 570, includes expectations 572 and 576 as well as other expectations of different dialog agencies and dialog agents that dialog agency 502 also subsumes. Since expectation agenda 570 may comprise the expectations of each dialog agent and dialog agency in task tree 500, expectation agenda 570 may include multiple sections including expectations 572, 574, and 576, the expectation sections may include increasingly larger contexts which are imposed by the current state of the dialog stack. In some embodiments, the expectation agenda may be constructed by the dialog engine 550 during an input phase in which the dialog engine 550 may place the various dialog agencies and dialog agents of task tree 500 on dialog stack 560.

As shown in the example embodiment of FIG. 5B, expectation agenda 570 may include expectations that specify information that each dialog agent expects to receives upon execution. For example, AskRegistered dialog agent 522, which is responsible for verifying whether a user is registered with the dialog application, may expect to receive a speech input from user input in the form of a "yes" or "no" speech input. Expectation 576 also specifies that such an input may update the Registered concept and that the Registered concept may be updated with a binary true or false binary result based on the received "yes" or "no" speech input. Similarly, Login dialog agency 510, which subsumes AskRegistered dialog agent 522 amongst other dialog agents and is responsible for handling all user logon dialog agents, may expect to receive a speech input from user input in the form of a "yes" or "no" speech input as the Registered concept and a user name from the user which updates the RegisteredName concept. Such expectations of dialog agency 510 may be stored as expectation 574 in expectation agenda 570.

In some embodiments, such as the embodiment depicted in FIG. 5B, dialog engine 550 may construct expectation agenda 570 in a piecemeal fashion in the order in which dialog agents and agencies are ordered in dialog stack 560. For example, dialog engine 550 may construct expectation agenda 570's data structure such that Login dialog agency 510's corresponding expectation 574 is structured adjacent to expectation 576 for dialog agent 522 that it subsumes. Similarly, dialog engine 550 may construct expectation agenda 570's data structure such that expectation 574 is structured adjacent to expectation 572, corresponding to dialog agency 502 that subsumes dialog agency 510 and is placed lower in dialog stack 560 than dialog agency 510. Such structuring of expectations in expectation agenda 570 may be determined by dialog engine 550 to reflect the order in which their corresponding dialog agents and dialog agencies are placed in dialog stack 560.

In some embodiments, dialog engine 550 may match inputs received from a user with the declared expectations compiled in expectation agenda 570 by a top down traversal of expectation 570. For example, dialog engine 550 may match user inputs 580 received from a dialog between the system (i.e., the dialog application) and the user. In the example embodiment depicted in FIG. 5B, the system outs system prompt 582 to the user asking whether the user is a registered user, as a result of the execution of the AskRegistered dialog agent 522 placed on top of task 560. Since dialog agent 522 is a request type dialog task, its execution requires the system to wait for a user input after outputting a prompt. Accordingly, the dialog application waits until the user has responded to prompt 582 with user input response 584. The dialog application may parse the user response to generate parsed user input 586. The dialog application may generate parsed user input 586 by parsing user input response 584 using NLP techniques. As shown in FIG. 5B, dialog engine 550 may identify that the parsed user input 586 contains user input values for the concepts that dialog agency 510 and dialog agent 522 require. Accordingly, dialog engine 550 may bind such user input values for whether the user is registered and user name to the Registered and RegisteredName concepts. Dialog engine 550 may determine that upon binding user inputted values to concepts results in satisfying the completion criteria of dialog agent 522 and dialog agency 510, as outlined by their respective expectations 576 and 574 in expectation agenda 570. Upon determining that the expectations of dialog agent 522 and dialog agency 510 have been met, the dialog engine 550 may remove dialog agent 522 and dialog agency 510 from dialog stack 560.

A top down traversal of expectation agenda 570, by dialog engine 550, may resolve any conflicts generated by multiple references to the same concept by different expectations. For example, if expectations exist for the same grammar slot in a dialog exist in multiple different expectations in expectation agenda 570, the expectation that is placed higher on expectation agenda 570 may take precedence over the conflicting expectation placed lower in expectation agenda 570 since the higher placed expectation is closer in context to the conversation between the dialog application and the user by virtue of being handled by the most subsumed dialog agent. Dialog engine 550 may structure expectation agenda 570 and dialog stack 560 such that highest placed dialog agencies in task tree 500 (i.e., the task tree elements most distanced from the context of the actual conversation) are placed lowest in expectation agenda 570 and dialog stack 560. As an example, the embodiment depicted in FIG. 5B shows in expectation agenda 570 that the [yes] slot is bound to the Registered concept (setting its value to true), but [user_name] is also bound to the Name concept which is also implemented by AskName dialog agent 524 and referred to in its corresponding expectation. Later when dialog engine 550 resumes the execution phase, the AskName dialog agent 524 will already have its completion criterion satisfied (i.e. the Name concept will be available), and will therefore not be scheduled for execution.

During the input phase, dialog engine 550 may analyze user input 580 for focus shifts in the dialog between the system and the user. Dialog engine 550 may determine if the focus of the conversation should be shifted in light of the recent input. The system may determine whether any of the dialog agents in the task tree need to be brought into focus in light of the recently gathered information from user input 580. For example, dialog engine 550, or the task manager, may determine, by analyzing the dialog input received from the user, whether the user desires to initiate a different task or shift the focus of the conversation to perform a task subroutine (e.g., dialog agent and/or dialog agency) not immediately scheduled for execution following the task subroutine currently being executed. Shifting focus of the task subroutine execution based on recently received user input may be a process similar to the construction of expectation agenda 570 in that each of the dialog agents in task tree 500 may be given an opportunity to declare a focus claim. Focus claims may be domain dependent and may be specified as trigger conditions of the dialog agents. If any dialog agent signals for a focus shift (i.e., submits a focus claim), the claiming dialog agent may be pushed by dialog engine 550 onto dialog stack 560 for execution. For example, if the claiming dialog agent indicates that the focus shift to its particular subroutine is required according to user input 580, then the claiming dialog agent is pushed to the top of the dialog stack.

In the event that there are no dialog agents claiming a focus shift, then dialog engine 550 may determine whether the dialog requires a modification of the task specification. The task manager or dialog engine 550 may be configured to allow modification of the task specification during runtime. For example, task tree 500 may be modified to add dialog agencies or dialog agents to preexisting dialog agencies, to remove preexisting dialog agencies or agents from task tree 500, or to change how preexisting dialog agencies and agents are ordered with respect to each other in task tree 500. Dialog engine 550 may be configured to mirror such a change in the task specification to the order of dialog agents in expectation agenda 570 and dialog stack 560. For example, when a user requests to reserve four different conference rooms, task tree 500 may be modified to repeat one or more of dialog agencies 512, 514 and dialog agents 516, 530, 532, 534, 540, 542, and 544 such that four different conference rooms are reserved based on the different search criteria for each of these four different conference rooms that the user has specified. Task manager or dialog engine 550 may modify the task specification in such a way as to minimize the number of turns in which information for all four instances of the conference room reservation is prompted to the user. Queries for information required for multiple instances of several task subroutines may be consolidated to facilitate faster and more efficient execution of the task. For example, if the user desires to reserve four different conference rooms, the task manager may instruct the dialog engine 550 of the conference room reservation task to repeat execution of the GetQuery dialog agency 514, the GetResults dialog agency 512, the Discuss Results dialog agency 516, the DateTime dialog agent 530, the Properties dialog agency 534, the Network dialog agent 540, the Projector dialog agent 542, and the Whiteboard dialog agent 544. The task manager may instruct dialog engine 550 to repeat execution of these dialog agents and agencies for four times in the order specified in task specification 500. The task manager may instruct the dialog engine 550 to repeat execution of these dialog agents and agencies for an additional three times once GetQuery dialog agency 514 receives dialog input from the user that requests reservation of four different conference rooms instead of the expected request of one room. Accordingly, the dialog engine may be able to dynamically scale the task according to instructions received from the user dialog input. The dialog engine 550 may communicate dialog input received from any dialog agent and dialog agency to the task manager so that the task manager can appropriately instruct the dialog engine how to scale the task and the order in which dialog agents and agencies are to be placed on dialog stack 560. However, the task manager may instruct the dialog engine to not repeat the Login dialog agency 510 and its subsumed dialog agents 520, 522, 524, and 526 more than once in order to avoid greeting the user and requiring logging on multiple times. By repeating certain dialog agents and agencies and not others, the application may perform the task in a sophisticated manner.

Upon termination of the input phase for a particular dialog agents and/or agencies, dialog engine 550 may initiate the execution phase of the next dialog agent or agency positioned at the top of dialog stack 560. In this order, dialog engine 550 may continue to traverse down task tree 500 and perform subroutines corresponding to the various dialog agents and agencies of task tree 500. Once dialog engine 550 has traversed task tree 500 and reached the last of the dialog agents in task tree 500 and determines that there are no additional dialog agents or agencies to be added for execution based on focus shifts, user inputs, or to improve conversational strategies, dialog engine may complete execution of the task. The task manager may retrieve useful information in the form of stored user input values, dialog agent output for use in another task that may require such information that has already been acquired and processed by the currently executing task for efficient execution of future tasks. Dialog engine 550 may terminate execution of the currently running task and signal the task manager that the currently running task has completed.

Figure 6:
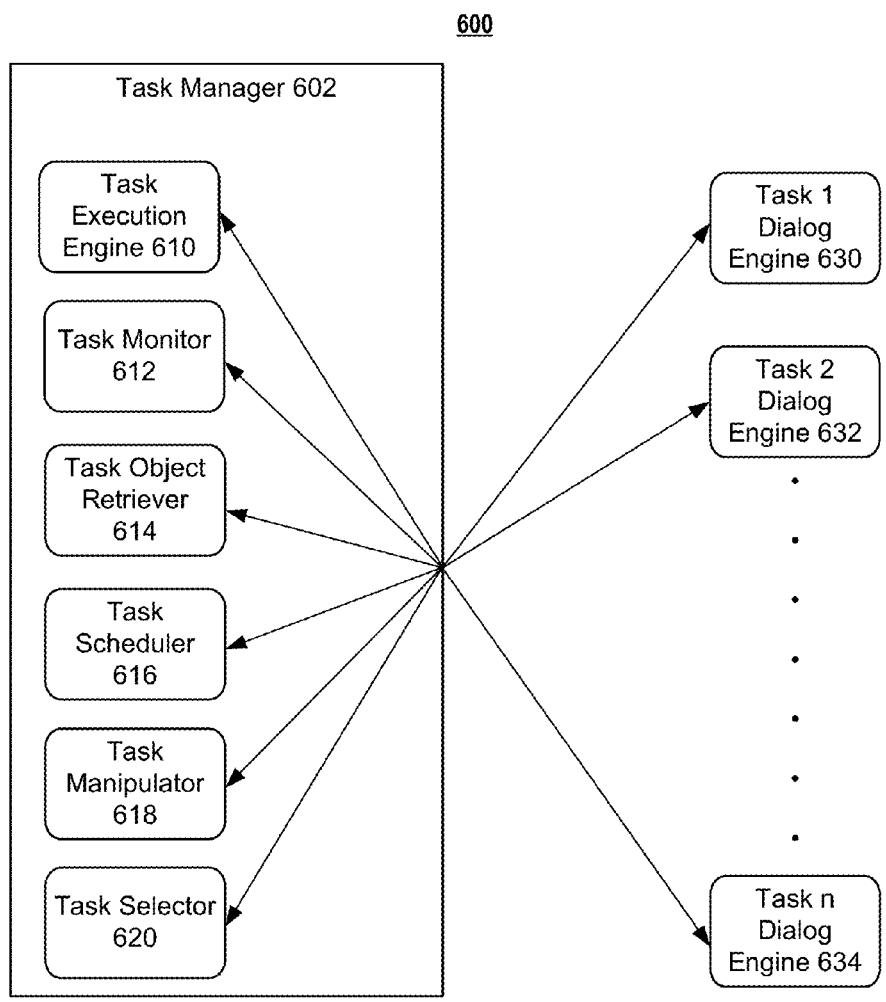
FIG. 6 depicts an illustrative diagram of a task manager in communication with multiple tasks in accordance with one or more illustrative aspects described herein.

FIG. 6 depicts a task management system 600 comprising task manager 602 in communication with multiple tasks of a dialog application. In some embodiments, task manager 602 may comprise several subcomponents, each responsible for performing a set of functions. As described by the embodiment shown in FIG. 6, task manager 602 may comprise task execution engine 610, task monitor 612, task object retriever 614, task scheduler 616, task manipulator 618, and task selector 620. Each of these subcomponents may be performed either by a single processor different processors or even different computing devices. In other embodiments, each of the functions performed by task manger 602 may not be grouped into modular subcomponents as described in FIG. 6, but can be performed by a single processor executing task manager 602. Task manager 602 may be in communication with dialog engines corresponding to the various tasks that it manages such as dialog engines 630, 632, and 634. In some embodiments, task manager 602 may handle tasks for a particular dialog application and different task managers may handle tasks for other dialog applications. These multiple task managers may communicate with each other for cross application communication. In other embodiments, task manager 602 may manage tasks performed by multiple dialog applications.

Tasks may be executed independently based on an intent based interpretation or they may be executed directly by a dialog application using task manager 602. Under intent based execution, a dialog application may launch tasks automatically based on an NLU ranking of user commands, state of the dialog, application specific intent evaluation programs, and intent slots. For example, an NLU interpretation of the user input may be used to determine which task to launch by identifying the intent of the dialog. However, when tasks are invoked directly by the dialog application, the dialog application may invoke an instance of task manager 602 to create and execute its tasks.

In some embodiments, the task manager 602 may invoke and manage execution of all tasks. The task manager may schedule task execution based on a predefined order specified in the programming of the task manager 602. Task manager 602 may schedule execution of a plurality of tasks once a specific type of dialog input is received from the user or in response to another trigger. For example, if the user says "Arrange a catered dinner party with my coworkers for Thursday night," task manager 602 may schedule execution of a multiple tasks in a specific order. Task manager 602 may first schedule a home cleaning task in which the user can specify parameters for scheduling a maid service appointment to clean the house. Second, the task manager 602 may schedule execution of a dinner catering task in which the user can specify, as dialog input, parameters for what type and how much food is to be ordered. Third, the task manager 602 may schedule execution of an invitation task in which email invitations can be sent to the user's coworkers and a party invitation can be created on a social media website. The user can specify, as dialog input, the parameters of which coworkers to invite and include additional details in the invitation task. Task manager 602 may be able to schedule execution of these three tasks automatically by parsing the dialog input of a command such as "Arrange a catered dinner party with my coworkers for Thursday night." Once a particular task is finished, the task manager 602 may execute the next task scheduled for execution. In scheduling these tasks for execution, the task manager 602 may assign task identifiers to each scheduled task to manage execution of each task and pass values between different tasks.

Task manager 602 may be initiated to start a new session by a dialog application. Task manager 602 may determine which task to execute initially and may also determine the order of execution of all other tasks managed by the dialog application. For example, when a new event session is processed, task manager 602 may initiate execution of an initial task specified by the dialog application. The task instance identifier of such an initial task and all other tasks, which uniquely identify instances of a given task, may be associated with the task, by task manager 602, until the task completes, exits or is aborted. Task manager 602 may also initialize tasks with dialog agent values by providing a map of dialog agent identifiers (i.e., addressing information for dialog agents in a task specification) to such stored values to be inputted to a task's specific dialog agents.

Task manager 602 may be configured to create, suspend, resume, abort, and exit different tasks. For example, task execution engine 610 may create a task object for a task requested by dialog application and assign that task a task identifier for future addressing. The task identifier may be formatted to be compatible with other task identifiers used by tasks for different dialog application systems for any inter-application task communication. Task execution engine 610 may begin execution of the task by instructing the dialog engine corresponding to the task to begin examining the task specification and initiate the execution phase. If task manager 602 detects that another task is running, then task execution engine 610 may determine if the currently executing task can be suspended in favor of the newly requested task. If it is determined that such a suspension is permissible, task execution engine 610 may suspend execution of the currently executing task (i.e., by invoking the suspend dialog agency to the top of the dialog stack of the currently executing task) and start execution of the newly requested task. Once the newly requested task has completed execution (i.e., task manager 602 may receive a message from the newly requested task signaling its completion), task execution engine 610 may resume running the previously executing task that was suspended. Task execution engine 610 may recall all of the stored user input values, parameters, and state of the previously running task and pass those values to the resumed task (i.e., task manager 602 may push a resume dialog agent, which is responsible for recalling such values, to the top of the dialog stack of the resumed task). If there is another task running when a task is resumed in response to a user command, task execution engine 610 may suspend that task and resume the task requested to be resumed. In response to user input command to abort a particular task, task execution engine 610 may immediately abort execution of that task without preserving state of the aborted task or generating any callbacks to the aborted task. Task manager 602 may place the dialog application into an idle state if there are no other tasks scheduled for execution.

Task manager 602 may also establish callback handlers for tasks that it manages. For example, task execution engine 610 may comprise an interrupt service handler subroutine that can be used to initiate new tasks, resume a previously running task, suspend a currently running task, abort a currently running task, or exit a completed task. Task execution engine 610 may execute such callback handlers once a trigger is set off. Such triggers may be set off in response to user commands to initiate new tasks, resume, suspend, abort or exit tasks.

Task manager 602 may be configured to manage different tasks by monitoring the state of different tasks. For example, task monitor 612, a subcomponent of task manager 602, may detect a state of any task that the dialog application desires to manage. For instance, whenever task manager 602 may check to see if any tasks are currently running or determine the last active time of any tasks, task monitor 612 may query the state of such a task by implementing a task state monitor function call. Task monitor 612 may receive the task identifier from task manager 602 and use such a task identifier to identify, task instance identifier and current state (i.e., one of created, active, suspended or finished) of a particular task. Task monitor 612 may be configured to return the dialog state of any task (i.e., the current state of execution of the task specification). For example, task monitor 612 may determine which dialog agent a currently running task is executing and whether the dialog engine is executing the input phase or the execution phase of that dialog agent by communicating with the dialog engine for that corresponding task. Task monitor 612 may also determine the state of task manager 602. For example, task monitor 612 may determine if task manager 602 is currently busy executing a function call and may schedule function calls by the task manager.

In addition to retrieving parameters from tasks, task manager 602 may also retrieve task objects. For example, task object retriever 614 may retrieve the task specification structure. For example, when task manager 602 decides to generate a new task tree for a newly requested task, task manager 602 may create a model for such a task using the task specification of one or more related tasks. Accordingly, task object retriever 614 may retrieve the task tree of such one or more task specifications. Task object retriever 614 may also retrieve a parameter or stored value from a currently running or completed task. For example, task object retriever 614 may retrieve user input values from parsed dialog, concepts, dialog agent outputs, data structures, and even software subroutines from any given task, currently executing or one that has completed execution. Task monitor 602 may retrieve such data in response to determining that another task may be able to use this information for its own execution.

Task manager 602 may retrieve a list of task objects for all tasks. For example, task object retriever 614 may communicate with task monitor 612 to determine the time each task was last active and accordingly may obtain a list of task objects ordered according to the amount of time since the task was last active. Task object retriever 614 may be configured to retrieve a task object for a particular task by supplying the task identifier. Task object retriever 614 may use the task identifier and retrieve the active task addressable using the task identifier. If the task requested is not an active task, then task object retriever 614 may retrieve a null object. Task object retriever 614 may also be commanded to retrieve the task object of a currently running task.

Task manager 602 may be configured to schedule tasks for execution. For example, task scheduler 616 may identify tasks scheduled for execution based on received user input. Task scheduler 616 may determine an order of execution for the scheduled tasks by analyzing the dialog to identify if the user has requested execution of a particular task before any other tasks. The task schedule 616 may rely on its own application logic to determine an order of execution for each of its scheduled tasks based on the preconditions, triggers, and completion criteria of each of the tasks. For instance, if task scheduler 616 determines that if a first task produces output that can be used to expedite the processing of other tasks, then that first task may be scheduled before the other tasks. As another example, if task scheduler 616 determines that a second task is requested by the user for execution by an urgently approaching deadline or with some indication of urgency, then task scheduler 616 may schedule the second task for execution earlier than other tasks. Task scheduler 616 may determine the next task scheduled for execution when a task is currently running and may even initialize the second task while the first task is running. The task scheduler 616 may also receive instructions from a task selector 620 for any task that it manages signaling if the order of execution of tasks needs to be modified based on activities within the task or due to additional instructions received from the user while the given task is being executed.

Task manager 602 may also set values for a currently running task or a task scheduled for execution. For example, task manipulator 618 may set values for concepts in the expectation agenda of particular dialog agent or agency. Task manager 602, using task object retriever 614, may have previously retrieved values for [user_name] from previous user logon for a separate task (i.e., online conference task associated with the same application used to reserve conference rooms according to the example described above with relation to FIG. 5). Task manipulator 618 may set the value for [user_name] in the currently running task to reserve conference rooms that it has retrieved from the online conference task. Task manipulator 618 may also directly set initial values for certain tasks while it is initializing such tasks. Task manipulator 618 may also set parameters for a given task. For example, task manipulator 618 may be able to pass a basic type, list, or map to a task for its subsequent use.

Task manager 602 may be configured to implement remote procedure calls (RPC) to enable distributed processing of task execution. For example, task manager 602 may initiate an inter-process communication technique that allows an application, which is executed partially on a user device and partially on a remote server in communication with the user device through a networked connection, to execute the task in a remote server address space without having to explicitly program the details of the remote interaction. For instance, task manager 602 may use common RPC libraries, security, synchronization, and data flow handling techniques to allow such distributed task execution to allow asynchronous task control. As an example, task manager 602, running on the user device may initiate function calls to a remote server implementing the task, by issuing commands to the remote server using RPC methods to create, suspend, resume, abort, and exit particular tasks.

Task manager 602 may comprise a task selector 620 which can interpret voice and text commands to control task execution. Task selector 620 may allow task manager 602 to override a default next task in response to a user command. For example, task scheduler 616 may automatically set a default next task for execution and a default initial task for execution when a dialog application starts. However, a user may specify that he wants a particular task to be run during execution of a currently running task. In this case, task selector 620 may initiate function calls to override the default next task set for execution by task scheduler 616 and may instead identify and select the task specified by the user command for execution. Task selector 620 may allow the dialog application to switch to a new task while a task is currently running in response to a user command. Task selector 620 may preserve the currently running task information and work with task execution engine 610 to establish callback handler routines to suspend and later resume the currently executing task and then to create and execute the task identified by task selector 620 in response to the user command.

In some embodiments, the task selector 620 may be a distributed component that runs on both task manager 602 and in different task dialog engines 630, 632, and 634. For example, task selector 620 may be a part of the dialog engines of different tasks which allows the dialog engine the ability to decide when to suspend their own task in favor of another task and/or the ability to modify the task that they are responsible for. Task selector 620 may be comprised of instructions in an application definition file that controls how a particular task can communicate between a dialog engine and the task manager to implement the task selector commands (e.g., the portion of task selector 620 executing on task manager 602). Task selector 620 may also be comprised of task specific instructions encoded by each task managed by the task manager (e.g., the portion of the task selector 620 executing on the task dialog engines). The task specific instructions for each task may define how the dialog engine is to modify execution, suspend, and resume the task's dialog agents and agencies in response to certain user instructions. The dialog engine may be configured to launch both application definition file instructions and task specific instructions to generate an application decision layer (e.g., the task selector) which selects what task to launch based on the dynamic dialog input received from the user. The task selector may continuously monitor all dialog input instructions received from the user and accordingly instruct the dialog engine which dialog agent and/or agency to push onto the top of the dialog stack in response to the received dialog input. The task selector may also instruct the dialog engine to communicate with the task manager to communicate that the current task needs to be suspended and a new task needs to be launched based on the received dialog input. For example, if the user specifies that he wishes to order a large pizza, the task selector may determine that a promotional task is to be launched to offer the user a free drink if the user answers a survey. The task selector may comprise instructions specifying that the promotional task is to be launched only if the user orders a large sized pizza instead of a small or medium sized pizza.

In some embodiments, task manager 602 may be configured to allow multiple tasks to use the same task specification. For example, task manager 602 may expand each task's task definition such that each task definition has a "name" property which allows multiple tasks to use the same task tree structure but to have different initial values and task handlers. The initial values element may allow task manager 602 to specify dialog agent values to be set as a task is being created. Task manger 602 may use a "class" property associated with a task to allow the dialog application to receive callbacks to start, exit, suspend, or resume a task by specifying the "class" property. Task manger 602 may use a "selection mode" property associated with a task to allow the dialog application to control when a task may be selected by task selector 620. Values of the "selection mode" property may either allow task selector 620 to control a task either always, when the task is not active, when the task does not exist, or never. For example, certain tasks may be configured such that the task selector 620 may not modify their operation. Other tasks may allow task selector 620 to suspend or modify the order of their execution whenever the task selector 620 best determines to be fit. Other tasks may allow the task selector 620 to modify the order of execution of tasks or suspend the task in favor of a different task only if certain criteria are met. The "selection mode" property in each task may specify such preferences and any such selection criteria that govern the conditional access given to task selector 620 to modify the execution of the task.

In some embodiments, task manager 602 may be able to rerank semantic interpretations of the dialog between the dialog application system and the user by continuously monitoring dialogs. For example, the task manager 602 may monitor dialogs across each of its tasks, both past and present, and rerank interpretations for specific types of dialogs based on such monitoring. Task manager 602 may apply the best ranked interpretation to received user input involving similar types of dialogs. Each time a dialog application NLU engine such as NLU engine 203 of FIG. 2 determines a semantic interpretation from parsed user input in the dialog with the dialog application system, the NLU engine may rerank all of the schematic interpretations to include the currently ranked semantic interpretation.

Task manager 602 may either launch a new task by applying a function call for the next scheduled task expecting an input or task manager 602 may apply the best available semantic interpretation for the entered user input in order to best determine which task the user input most appropriately calls for. For example, when a new user input is entered, the dialog application system may determine what type of input the newly entered user input can be classified as and may assign a best fit task to that user input using the best ranked semantic interpretation. By applying the best semantic interpretation, the dialog application system 600 may best be able to understand the true goal and intent of the user command and accordingly may launch tasks to achieve that goal. Task manager 602 may add, remove, or modify intent slots in the best semantic interpretation to associate the semantic interpretation of a user command to a particular task. Task manager 602 may process a user input and determine that such a user input was best semantically processed when a particular type of task was executed. The next time such a user input type is encountered, task manager 602 may add an intent slot to the parsed user input and may apply the semantically best fit task to that parsed user input command as identified by the intent slot found in the best fit semantic interpretation. In such situations, the user may never be exposed to semantic interpretations. Instead, the user merely sees that a particular task is executed once his user input is entered into the dialog application system. Alternatively, if there are no semantic interpretations that fit the user input, then task manager 602 may not execute any tasks based on the user input.

Figure 7:
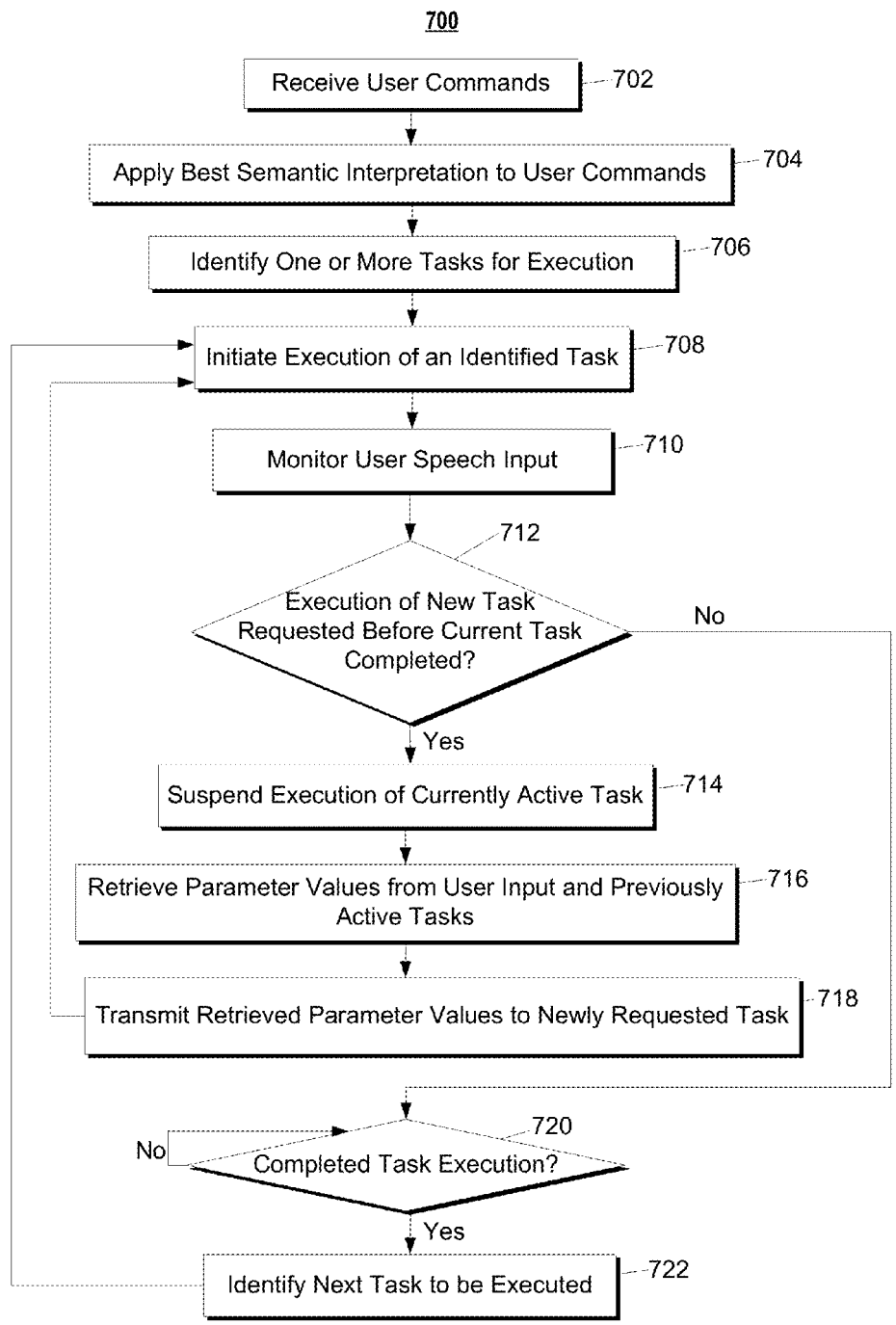
FIG. 7 depicts a flowchart that illustrates a method of coordinating execution of multiple dialog tasks in accordance with one or more illustrative aspects described herein.

FIG. 7 depicts an illustrative method 700 for coordinating execution of multiple dialog tasks in accordance with one or more example embodiments. In one or more embodiments, method 700 of FIG. 7 and/or one or more steps thereof may be performed by a dialog application running on a computing device (e.g., client computing devices 107 and 109 or data server 103). In other embodiments, method 700 illustrated in FIG. 7 and/or one or more steps thereof may be embodied in computer-executable instructions (i.e., the dialog application) that are stored in a computer-readable medium, such as a non-transitory computer-readable memory. The term "dialog application system," as used hereinafter with relation to FIG. 7 may refer to either client computing devices, remote server, computer readable medium, or any combination of one or more devices with processing circuitry used to perform one or more steps of method 700.

As seen in FIG. 7, the method may begin at step 702 in which the dialog application system may receive user commands. The user commands may be input as either text or speech input into a client computing device such as user client 201 of FIG. 2. Speech and text user commands may be processed by an ASR engine, NLU engine, and a context sharing module before being processed by a dialog application system into parsed user commands. A task manager associated with the dialog application system, such as task manager 302 of FIG. 3 and task manager 602 of FIG. 6, may process the parsed commands.

In step 704, the dialog application system may apply a best ranked semantic interpretation to the received user commands. The dialog application system may process the parsed user input for implementing tasks by first understanding the intent of the user command. Accordingly, the dialog application system's task manager may identify which class of previously categorized class order of user inputs the received user input best matches. Upon identifying the class of user input, the task manager may apply the best semantic interpretation for that particular class of user input to the received user input.

In step 706, the dialog application system may identify one more tasks for execution. By applying the best ranked semantic interpretation to the received user input, the task manager may identify the intent of the user command and may identify one or more tasks for execution. Such identified tasks may be associated with the best ranked semantic interpretations applied to the user commands. The task manager may schedule the identified tasks according to an appropriate order by determining the urgency of the user requested tasks. Task manager may also identify an initial task for execution at the time of application launch, the execution of which may be performed independently of receiving any user commands.

In step 708, the dialog application system may initiate execution of the one or more identified tasks. The dialog application system's task manager may initiate a function call or a remote procedure call to execute a task identified for imminent execution. Task manager may pass available values and parameters to a dialog engine of the corresponding task in the function call. The task dialog engine may identify dialog agents and/or agencies from the dialog task's corresponding task specification and order execution of such dialog agents and/or agencies in a dialog stack. The dialog engine may alternate between an execute phase and an input phase for each dialog agent and/or agency as it traverses down a task tree of the task specification. The dialog engine may construct an expectation agenda for each dialog agent and/or agency and may facilitate a dialog with the user. The dialog engine may process the parsed user inputs to perform functions that fulfill the completion criteria of the task.

In step 710, the dialog application system may monitor user speech input during execution of an identified task. The dialog engine and task manager of the dialog application system may each monitor the speech input received during execution of a task in order to facilitate execution of the task and also to determine if the user wants to perform activities related to other tasks. For example, the task manager may monitor a processed user input to determine if the user desires to create a new task, suspend, abort or exit the current task, or resume a previously suspended task. User commands for performing such task related functions may be received asynchronously and the task manager may also facilitate asynchronous control over its managed tasks.

In step 712, the dialog application system may determine whether execution of a new task has been requested before the current task has completed. For example, the task manager may determine whether a task is requested for execution at a time during which a currently active task is executing. The dialog application system may determine the urgency of the requested task and determine whether its execution can be delayed to a later time when the currently active task has completed its execution. The task manager may further determine whether execution of the newly requested task is critical for completion of the currently active task.

In response to determining that the execution of a new task has been requested before the current task has completed, in step 714, the dialog application system may suspend execution of the currently active task. If the task manager determines, as a result of performing such determinations described in step 712, that the newly requested must be executed before the currently active task has completed execution, then the task manager may suspend execution of the currently active task. For example, the task manager may initiate a callback routine handler to invoke the currently active task's dialog engine to place a suspend dialog agency at the top of its dialog stack. Accordingly, the dialog engine of the currently active task, under direction of the task manager, may preserve the current state of execution of the task, store any user input values, initialized task subroutines, generated expectation agendas, dialog stacks, and parsed user input to be later recalled when the task is resumed. The dialog engine of the current task may signal the task manager when the task has been suspended.

In step 716, the dialog application system may retrieve parameter values from user input and previously active tasks. The task manager may retrieve any information such as user input values and any other parameters obtained from previously active tasks that may be necessary for the execution of the newly requested task. The task manager may be able to identify the parameters that the newly requested task requires by examining the inputs required by the newly requested task's dialog agents and agencies. The task manager may retrieve such values from various tasks that it identifies may have already received and stored such data as a virtue of their previous implementation. Accordingly, the task manager may retrieve such data from storage locations in which various previously active tasks have preserved parsed user input and such data.

In step 718, the dialog application system may transmit the retrieved parameter values to a newly requested task. For example, the task manager may transmit, to the newly requested task, the data required by the newly requested task that the task manager has retrieved from any previously active tasks and user input. Upon transmitting such data to the newly requested application, method 700 may return to step 708 where the dialog application system may again initiate execution of the identified task. For example, the task manager may execute the newly requested task by performing steps 708, 710, 712, 714, 716, and 718 again in a loop. Such a loop may continue until a currently active task is not suspended because of another new task being requested before the currently active task reaches successful completion.

In step 720, the dialog application system may determine whether the currently active task has completed execution. If the task manager has not suspended the currently active task and determined, in step 712, that the execution of a new task has not been requested before the current task has completed, then task manager 720 may determine whether the currently active task has completed its execution. The task manager may periodically perform step 720 during execution of the currently active task. Alternatively, the task manager may only perform such a determination once it has determined that the completion criteria of all of the dialog agents and agencies of the currently active task have been met.

In step 722, the dialog application system may identify the next task to be executed in response to determining that the currently active task has completed execution. Once the task manager has determined in step 720 that execution of the currently active task has completed, the task manager may identify the next task to be executed. For example, the task manger may determine from a schedule of tasks which task is to be executed next by examining user dialog input. Upon identifying the next task for execution, method 700 may return to step 708 where the dialog application system may again initiate execution of the identified task. For example, the task manager may execute the next scheduled task by performing steps 708, 710, 712, 714, 716, and 718, 720, and 722 again in a loop. Such a loop may continue until there are no tasks scheduled for execution, in which case method 800 may optionally return to step 702 and wait for further user commands instructing the dialog application to execute new tasks.

Figure 8A:
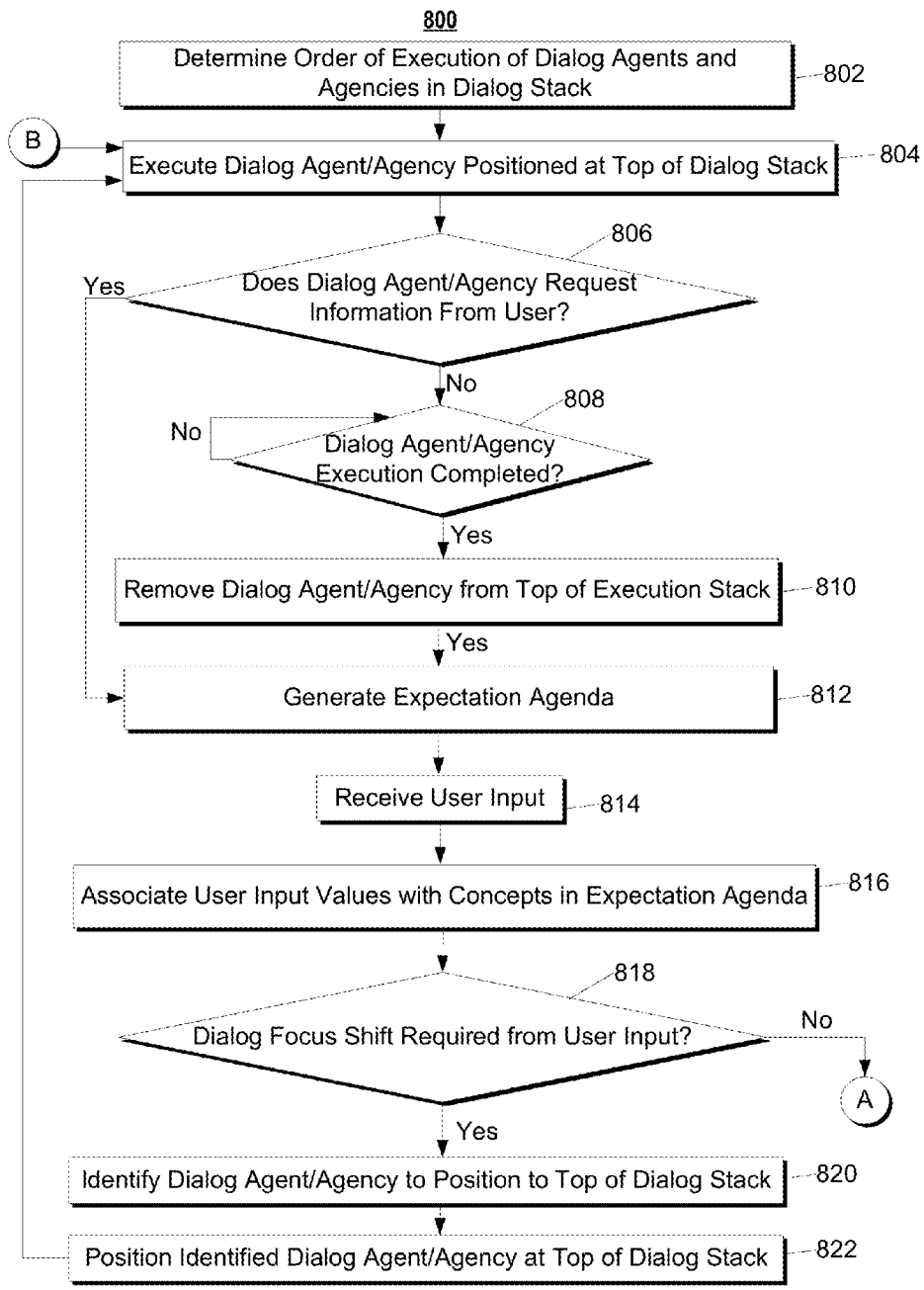
FIGS. 8A and 8B depict a flowchart that illustrates a method of executing a dialog task in accordance with one or more illustrative aspects described herein.
Figure 8B:
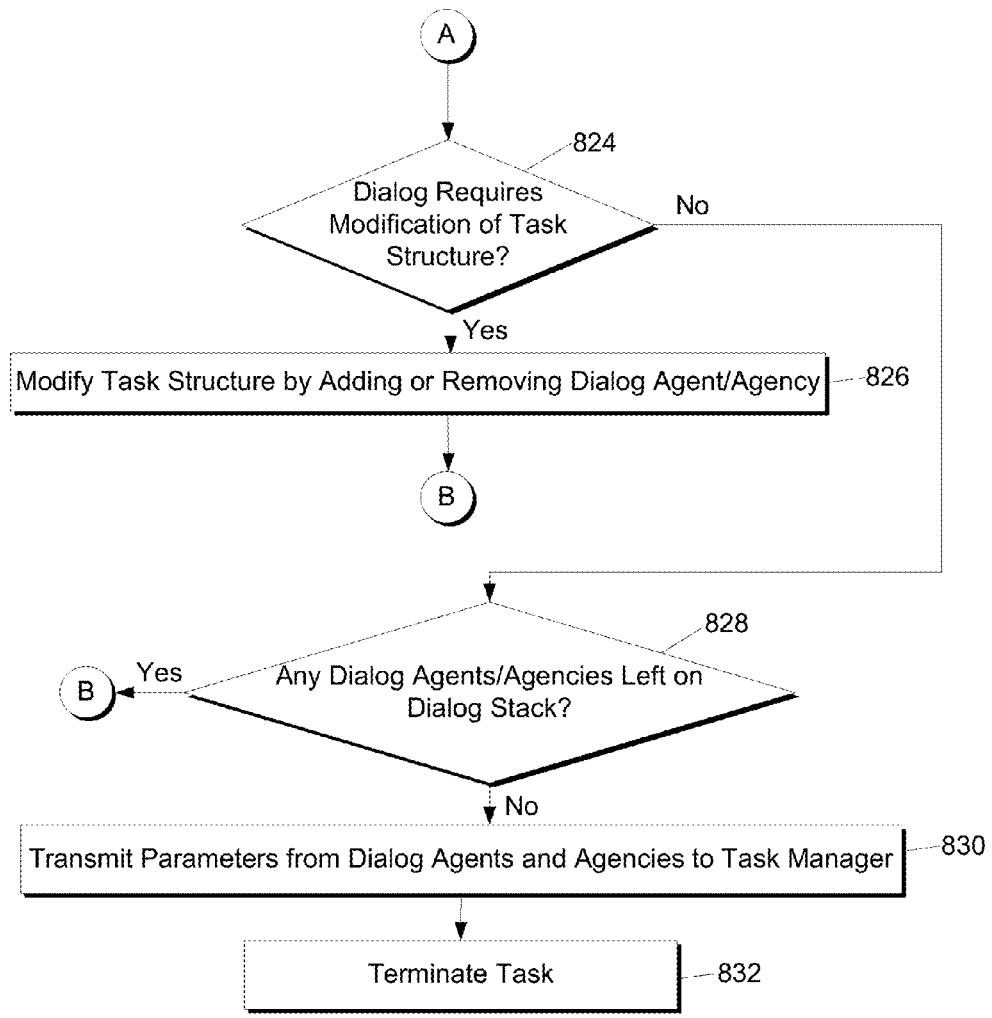

FIGS. 8A and 8B depict an illustrative method 800 by which a dialog task may be executed in accordance with one or more example embodiments. In one or more embodiments, method 800 of FIGS. 8A & 8B and/or one or more steps thereof may be performed by a task's dialog engine such as dialog engine 550 of FIG. 5B. Method 800 of FIGS. 8A & 8B may describe the processes implemented in step 708 of FIG. 7. In other embodiments, method 800 and/or one or more steps thereof may be embodied in computer-executable instructions (i.e., the dialog application) that are stored in a computer-readable medium, such as a non-transitory computer-readable memory.

As seen in FIG. 8A, method 800 may begin at step 802 in which the task's dialog engine may determine the order of execution of dialog agents and/or agencies in the task's dialog stack. The task dialog engine may examine the task's specification to determine the relationship of the various dialog agents and dialog agencies with relation to each other as identified by a task tree in the task specification. The dialog engine may examine the task tree and accordingly schedule the various dialog agents and/or agencies for execution in the order specified in the task specification. For example, the dialog engine may traverse down the dialog task tree and place the lowermost dialog agent on the task tree on the top of a dialog stack. Dialog engine may also place dialog agents and agencies found at higher up nodes in the task tree lower on the dialog stack than dialog agents that are subsumed by them. Such ordering of the dialog stack may provide an order of execution to the various dialog agents and/or agencies identified by the task's specification.

In step 804, the dialog engine may execute a dialog agent or agency positioned at the top of the dialog stack. Once the dialog stack has been assembled, the dialog engine may execute the dialog agent or agency located at the top of the dialog stack. The dialog engine may always only execute the dialog agent or agency that is located at the top of the dialog stack. Upon completion of such a dialog agent or agency, the dialog engine may remove that completed dialog agent or agency from the top of the dialog stack such that the dialog agent or agency located below the previously active dialog agent or agency on the dialog stack rises to the top of the dialog stack. In this manner, the dialog engine may execute all the dialog agents and agencies in the order in which the dialog stack specifies by executing the dialog agent or agency that happens to be located at the top of the dialog stack. The dialog engine may first initiate the execution phase of the dialog agent or agency to be later followed by the input phase. In the execution phase, the dialog engine may perform functions specified by the dialog agent. For example, the dialog engine may display information to the user, request information from the user, perform backend processes, implement conversational strategies, monitor NLU performance of other dialog agents and/or agencies etc.

In step 806, the dialog engine may determine whether the dialog agent or agency requests information from the user. For example, the dialog engine may determine whether the dialog agent or agency currently being executed is a request type dialog agent or agency. The dialog engine may determine the type of the dialog agent or agency by examining the parameters of the dialog agent or agency specified in the task specification. If the dialog engine determines that the dialog agent or agency requests information from the user, the dialog engine may initiate the input phase by proceeding to step 812.

In step 808, the dialog engine may determine whether execution of the dialog agent or agency has completed. If the dialog agent or agency currently being executed by the dialog engine is not a request type dialog agent, the dialog engine may complete its execution phase when all of its function calls have been executed. Accordingly, the dialog engine may determine whether the dialog agent or agency has indicated that that its execution phase has terminated (i.e., by triggering its input phase).

In response to determining that the execution of the dialog agent or agency has completed, in step 810, the dialog engine may remove the dialog agent or agency from the top of the execution stack. The dialog engine may remove dialog agents or agencies that have just completed their execution phase from the top of the dialog stack. The dialog engine may completely remove the dialog agent or agency from the dialog stack altogether or may position the dialog agent or agency at a different location in the dialog stack by examining whether the dialog agent or agency will be required to be executed again according to the dialog task's specification.

In step 812, the dialog engine may generate a portion of the expectation agenda corresponding to the dialog agent or agency. The dialog engine may query the dialog agent or agency for data that it expects to receive from user input to construct sections of the expectation agenda related to the task. The expectation agenda may include concepts and parameters that need to be initialized with user supplied information. The expectation agenda may be constructed piecemeal as the dialog engine steps through the dialog agents and agencies according to the order specified in the dialog stack. The sections of the expectation agenda that are generated may list the parameters that are expected to be identified and be associated with values during execution of the corresponding dialog agent or agency.

In step 814, the dialog engine may receive user input from the user. For example, request and expect type dialog agents may receive direct user input during their input phase. The dialog application may prompt the user to enter information in a conversational dialog. Such prompting may be executed during the execution phase of the dialog agent or agency. During the input phase, the dialog engine may capture the user's entered speech or text inputs to such prompts. Even if no prompts are requested (i.e., in the case of expect dialog agents), the dialog engine may expect to receive user input to aid in the execution of the task. Accordingly, the dialog engine may reserve a period of time during which it awaits user inputs to be entered for such dialog agents and/or agencies. The dialog engine may receive parsed user inputs from the ASR engine.

In step 816, the dialog engine may associate user input values with concepts in the expectation agenda. The dialog engine may analyze parsed received user inputs to identify which concepts identified in the dialog agent or agency's expectation agenda may be bound to the user inputted values. Upon associating such user input values with the identified concepts and subroutines awaiting user input values for initialization, the dialog engine may pass the values onto different dialog agent or agency in the task that may use such information to perform their execution phase.

In step 818, the dialog engine may determine whether the previously received user input requires a shift in the dialog focus. The dialog engine may analyze user input to determine whether there are any semantic clues to indicate that a different dialog agent or agency needs to be implemented. For example, the dialog engine may determine that the user has changed the focus of the conversation from supplying room reservation information to specifying a list of attendees to invite to the conference room according to the conference room reservation task example of FIG. 5.

In response to determining that the user input requires a shift in the dialog focus, in step 820, the dialog engine may identify a dialog agent or agency to position to the top of the dialog stack. In response to determining that the focus of the conversation has shifted to a dialog agent or agency that is not immediately associated with the currently active dialog agent or agency, the dialog engine may determine which dialog agents and/or agencies to execute to address the focus shift in the user dialog. The dialog engine may apply semantic interpretations to the received user input dialog to determine which dialog agent or agency best fits the semantic interpretation of the user input.

In step 822, the dialog engine may position the identified dialog agent or agency at the top of the dialog stack. Once the dialog engine has identified at least one dialog agent or agency to execute in response to the focus shift, the dialog engine may position that identified onto the top of the dialog stack for immediate execution. The dialog engine may determine that the particular dialog agent or agency is located lower in the dialog stack and may retrieve it to place at the top of the stack. Once the dialog engine places the identified dialog agent or agency at the top of dialog stack, method 800 may return to step 804 where the dialog engine may again execute the dialog agent or agency positioned at the top of the dialog stack. The dialog engine may execute the newly positioned dialog agent or agency by performing steps 804, 806, 808, 810, 812, 814, 816, 818, 820, and 822 again in a loop. Such a loop may continue until no further focus shifts are required in step 818.

As depicted in FIG. 8B, in response to determining in step 818 that the user input does not signal a shift in the dialog focus, in step 824, the dialog engine may determine whether the dialog requires modification of the task structure. For example, the dialog engine may monitor the user input to determine whether the user commands require adding or removing dialog agents and/or agencies to the task tree of the currently executing task in order to better facilitate execution of the current task. For example, the dialog engine may determine that a particular task requires modifying the task structure by replicating particular dialog agents or executing multiple instances of one or more dialog agents or agencies.

In response to determining in step 824 that the dialog requires modification of the task structure, in step 826, the dialog engine may modify the task structure by adding or removing dialog agents and/or agencies to the dialog stack. For example, the dialog engine or the task manager may create new dialog agents and/or agencies or new instances of preexisting dialog agents and/or agencies in the dialog stack. Alternatively, the dialog engine or the task manager may remove preexisting dialog agents and/or agencies from the dialog stack. Such modification of the dialog stack may be reflected in the expectation agenda and may help customize the dialog to meet the needs of the user. The task specification of any given task may be a scalable such that dialog engine may add or remove dialog agents and/or agencies to the task's tree structure in runtime to adapt to the dialog. Once the dialog engine modifies the task structure by modifying the task's dialog stack and expectation agendas, method 800 may return to step 804 where the dialog engine may again execute the dialog agent or agency positioned at the top of the dialog stack. The dialog engine may execute the newly positioned dialog agent or agency by performing steps 804, 806, 808, 810, 812, 814, 816, 818, 820, 822, 824, and 826 again in a loop. Such a loop may continue until no further focus shifts are required in step 818 and no task structure modifications are required in step 824.

In response to determining in step 824 that the dialog does not require modification of the task structure, in step 828, the dialog engine may determine any dialog agents or agencies are left on the dialog stack awaiting execution. The dialog engine may monitor the dialog stack to determine whether any dialog agents or agencies of a given task have not been executed. If it is determined that there are indeed dialog agents and/or agencies awaiting execution on the dialog stack, the method may proceed to step 804 to execute the dialog agent or agency positioned at the top of the dialog stack. The dialog engine may complete its input phase when it has determined that all dialog agents and/or agencies identified in the task tree (and the dialog stack) have been executed and have met their respective completion criteria.

In response to determining that there are no dialog agents or agencies awaiting execution on the dialog stack and that completion criteria for all of the dialog agents and/or agencies have been met, in step 830, the dialog engine may transmit parameters from the task's dialog agents and/or agencies to the task manager. For example, the dialog engine may retrieve any information such as user input values and any other parameters obtained from its dialog agents and/or agencies that may be useful for the execution of other tasks that may share the same dialog agents and/or agencies. The task manager may request such information from the dialog engine once it detects that the task is nearing completion and has such information to supply.

In step 832, the dialog application system may terminate the task. For example, the dialog engine may transmit a message to the task manager indicating that it has met its completion criteria and accordingly is ready to be terminated. Accordingly, the task manager may invoke an exit callback handler subroutine. The exit callback handler subroutine may terminate the task and clear any active task state from the memory of the computing device upon having preserved the necessary information that the task manager needs to store from the task.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    identifying, by a computing device, that a first natural language user input, received at the computing device, comprises a request to perform a first dialog task;
    determining a first hierarchical order for arranging execution of a first plurality of task agents corresponding to the first dialog task;
    responsive to determining the first hierarchical order, initiating execution, by the computing device, of the first plurality of task agents according to the first hierarchical order;
    responsive to a determination that a second natural language user input, received at the computing device during execution of the first plurality of task agents, comprises a request to perform a second dialog task, determining, by the computing device, that the second dialog task is to be executed before execution of the first plurality of task agents is completed;
    determining a second hierarchical order for arranging execution of a second plurality of task agents corresponding to the second dialog task;
    activating, based on a determination of whether execution of the second plurality of task agents would cause a runtime error, the second plurality of task agents;
    initiating execution, by the computing device prior to completion of the execution of the first plurality of task agents, of the second plurality of task agents according to the second hierarchical order; and
    resuming execution of a task agent of the first plurality of task agents, wherein the execution of the task agent comprises using, by the task agent, at least a portion of the second natural language user input.

2. The method of claim 1, further comprising:
    responsive to determining that the second natural language user input comprises the request to perform the second dialog task, suspending execution, by the computing device, of the first plurality of task agents; and
    preserving, by the computing device, a state of a natural language dialog and user inputs received during execution of the first plurality of task agents.

3. The method of claim 2, wherein resuming execution of the task agent comprises:
    responsive to determining that execution of the second plurality of task agents has completed, retrieving, by the computing device, the state of the natural language dialog and user inputs received during execution of the first plurality of task agents.

4. The method of claim 1, wherein initiating execution of the first plurality of task agents further comprises scheduling for execution, by the computing device, each task agent of the first plurality of task agents in an order based on the first hierarchical order, and wherein initiating execution of the second plurality of task agents further comprises scheduling for execution, by the computing device, each task agent of the second plurality of task agents in an order based on the second hierarchical order.

5. The method of claim 1, further comprising:
switching, by the computing device, between different dialog task agents based on a natural language dialog between a user and the computing device.

6. The method of claim 1, wherein execution of the first plurality of task agents comprises:
generating, by the computing device, a list of parameters that each of the first plurality of task agents is configured to identify from a natural language dialog; and
responsive to parsing the natural language dialog, associating, by the computing device, at least one user input value from the natural language dialog with each parameter in the list of parameters.

7. The method of claim 1, further comprising:
determining, by the computing device, that the second natural language user input comprises instructions to modify the first dialog task by adding additional task agents to the first hierarchical order; and
scheduling for execution, by the computing device, the additional task agents according to the first hierarchical order.

8. The method of claim 1, wherein determining the first hierarchical order comprises traversing a dialog task tree.

9. The method of claim 1, wherein initiating execution of the first plurality of task agents according to the first hierarchical order comprises placing, based on the first hierarchical order, the first plurality of task agents on a stack.

10. An apparatus, comprising:
at least one processor; and
at least one memory storing computer-readable instructions that, when executed by the at least one processor, cause the apparatus to:
identify that a first natural language user input, received at the apparatus, comprises a request to perform a first dialog task;
determine a first hierarchical order for arranging execution of a first plurality of task agents corresponding to the first dialog task;
initiate execution of the first plurality of task agents according to the first hierarchical order;
responsive to a determination that a second natural language user input, received during execution of the first plurality of task agents, comprises a request to perform a second dialog task, determine that the second dialog task is to be executed before execution of the first plurality of task agents is completed;
determine a second hierarchical order for arranging execution of a second plurality of task agents corresponding to the second dialog task;
initiate execution, prior to completion of the execution of the first plurality of task agents, of the second plurality of task agents according to the second hierarchical order;
suspend, based on a determination that a task agent of the second plurality of task agents would cause a runtime error, the second dialog task; and
resume execution of a task agent of the first plurality of task agents.

11. The apparatus of claim 10, wherein the instructions, when executed by the at least one processor, further cause the apparatus to:
suspend execution of the first plurality of task agents in response to the determination that the second natural language user input comprises the request to perform the second dialog task; and
preserve a state of a natural language dialog and user inputs received during execution of the first plurality of task agents.

12. The apparatus of claim 11, wherein the instructions that cause the apparatus to resume execution of the task agent comprise instructions that cause the apparatus to retrieve the state of the natural language dialog and user inputs received during execution of the first plurality of task agents.

13. The apparatus of claim 10, wherein the instructions that cause the apparatus to initiate execution of the first plurality of task agents comprise instructions that cause the apparatus to schedule execution of each task agent of the first plurality of task agents in an order based on the first hierarchical order, and wherein the instructions that cause the apparatus to initiate execution of the second plurality of task agents comprise instructions that cause the apparatus to schedule execution of each task agent of the second plurality of task agents in an order based on the second hierarchical order.

14. The apparatus of claim 10, wherein the instructions, when executed by the at least one processor, further cause the apparatus to switch between different dialog task agents based on a natural language dialog between a user and the apparatus.

15. The apparatus of claim 14, wherein the instructions, when executed by the at least one processor, further cause the apparatus to:
generate a list of parameters that each of the first plurality of task agents is configured to identify from a natural language dialog user input received at the apparatus; and
associate at least one user input value from the natural language dialog user input with each parameter in the list of parameters upon parsing the natural language dialog user input.

16. The apparatus of claim 10, wherein the instructions, when executed by the at least one processor, further cause the apparatus to:
determine that a natural language dialog user input, received at the apparatus, comprises instructions to modify the first dialog task by adding additional task agents to the first hierarchical order; and
schedule, for execution, the additional task agents according to the first hierarchical order.

17. A method comprising:
identifying, by a computing device, that a first natural language user input, received at the computing device, comprises a request to perform a first dialog task;
determining a first hierarchical order for arranging execution of a first plurality of task agents corresponding to the first dialog task;
initiating execution, by the computing device and based on the first hierarchical order, of the first plurality of task agents;
responsive to a determination that a second natural language user input, received at the computing device during execution of the first plurality of task agents, comprises a request to perform a second dialog task, determining, by the computing device, that the second dialog task is to be executed before execution of the first plurality of task agents is completed;

determining a second hierarchical order for arranging execution of a second plurality of task agents corresponding to the second dialog task;

initiating execution, by the computing device, prior to completion of the execution of the first plurality of task agents, and based on the second hierarchical order, of the second plurality of task agents; and preventing, based on a determination that execution of a task agent of the second plurality of task agents would cause a runtime error, execution of the task agent.

18. The method of claim 17, wherein determining the first hierarchical order comprises traversing a tree.

19. The method of claim 17, wherein initiating execution of the first plurality of task agents comprises placing the first plurality of task agents on a stack.

20. The method of claim 17, further comprising retrieving user inputs received during execution of the first plurality of task agents.

* * * * *